United States Patent
Lee et al.

(10) Patent No.: US 12,010,068 B2
(45) Date of Patent: Jun. 11, 2024

(54) METHOD AND APPARATUS COMMUNICATION USING BEAM-FORMING IN WIRELESS COMMUNICATION SYSTEM

(71) Applicant: SAMSUNG ELECTRONICS CO., LTD., Suwon-si (KR)

(72) Inventors: Junho Lee, Hwaseong-si (KR); Jaein Kim, Seoul (KR); Huiwon Je, Osan-si (KR); Jinwon Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 17/643,219

(22) Filed: Dec. 8, 2021

(65) Prior Publication Data

US 2022/0224461 A1     Jul. 14, 2022

(30) Foreign Application Priority Data

Jan. 11, 2021   (KR) ........................ 10-2021-0003565

(51) Int. Cl.
*H04L 5/00*       (2006.01)

(52) U.S. Cl.
CPC ............ *H04L 5/006* (2013.01); *H04L 5/0048* (2013.01); *H04L 5/0082* (2013.01)

(58) Field of Classification Search
CPC .. H04B 7/0404; H04B 7/0608; H04B 7/0691; H04B 7/0874; H04L 25/0224; H04L 5/0048; H04L 5/006; H04L 5/0082
See application file for complete search history.

(56) References Cited

U.S. PATENT DOCUMENTS

| | | |
|---|---|---|
| 8,121,537 B2 | 2/2012 | Hwang et al. |
| 8,238,405 B2 | 8/2012 | Mehta et al. |
| 9,306,649 B2 | 4/2016 | Kang et al. |

(Continued)

FOREIGN PATENT DOCUMENTS

| | | | | |
|---|---|---|---|---|
| EP | 4027530 A1 | * | 7/2022 | ........... H04L 5/0048 |
| KR | 10-1531031 | | 6/2015 | |

(Continued)

OTHER PUBLICATIONS

Extended European Search Report dated Jun. 9, 2022 in corresponding European Patent Application No. 21213974.5 (12 pages).

(Continued)

*Primary Examiner* — Nader Bolourchi
(74) *Attorney, Agent, or Firm* — F. CHAU & ASSOCIATES, LLC

(57) ABSTRACT

A method of operating a wireless communication device including a plurality of antennas according to an exemplary embodiment of the present disclosure includes determining an antenna subset including at least one of the plurality of antennas, transmitting a sounding reference signal (SRS) switching signal to a base station through at least one antenna of the antenna subset, receiving a channel state information-reference signal (CSI-RS) transmitted using a first beam from the base station, selecting a precoding matrix indicator (PMI) based on the CSI-RS, transmitting the selected PMI to the base station, and receiving a signal transmitted from the base station through a second beam determined based on the SRS switching signal and the PMI.

19 Claims, 18 Drawing Sheets

(56) References Cited

U.S. PATENT DOCUMENTS

| | | |
|---|---|---|
| 9,497,047 B2 | 11/2016 | Josiam et al. |
| 10,270,570 B2 | 4/2019 | Liu et al. |
| 10,715,233 B2 | 7/2020 | Yan et al. |
| 2013/0010659 A1 | 1/2013 | Chen et al. |
| 2017/0317866 A1 | 11/2017 | Stirling-Gallacher et al. |
| 2019/0021079 A1 | 1/2019 | Stirling-Gallacher et al. |
| 2019/0068260 A1* | 2/2019 | Yan ............... H04B 7/0404 |
| 2019/0222277 A1 | 7/2019 | Park et al. |
| 2020/0220676 A1 | 7/2020 | Xu et al. |

FOREIGN PATENT DOCUMENTS

| | | |
|---|---|---|
| WO | 2018232101 | 12/2018 |
| WO | 2019112499 | 6/2019 |
| WO | WO-2019112499 A1 * | 6/2019 |

OTHER PUBLICATIONS

Huawei, et al., "Discussion on reciprocity based CSI acquisition mechanism", 3GPP TSG RAN WGI NR Ad Hoc Meeting Qingdao, China, Jun. 27-30, 2017; R1-1711404, 3rd Generation Partnership Project(3GPP), Mobile Competence Centre; 650, Route Dex Lucioles; F-06921 Sophia-Antipolis Cedex; France, 4 pages.

Media Tek Inc., FR2 SRS antenna switching, 3GPP TSG-RAN WG4 Meeting #90bis Xi'an, China, Apr. 8-12, 2019 ; R4-1903390, 3rd Generation Partnership (3GPP), Mobile Competence Centre; 650, Route Des Lucioles; F-06921 Sophia-Antipolis Cedex France, vol. RAN WG4, No. Xi'an, China; Apr. 8, 2019-Apr. 12, 2019 Apr. 1, 2019 (Apr. 1, 2019), XP051713814, 3 pages.

\* cited by examiner

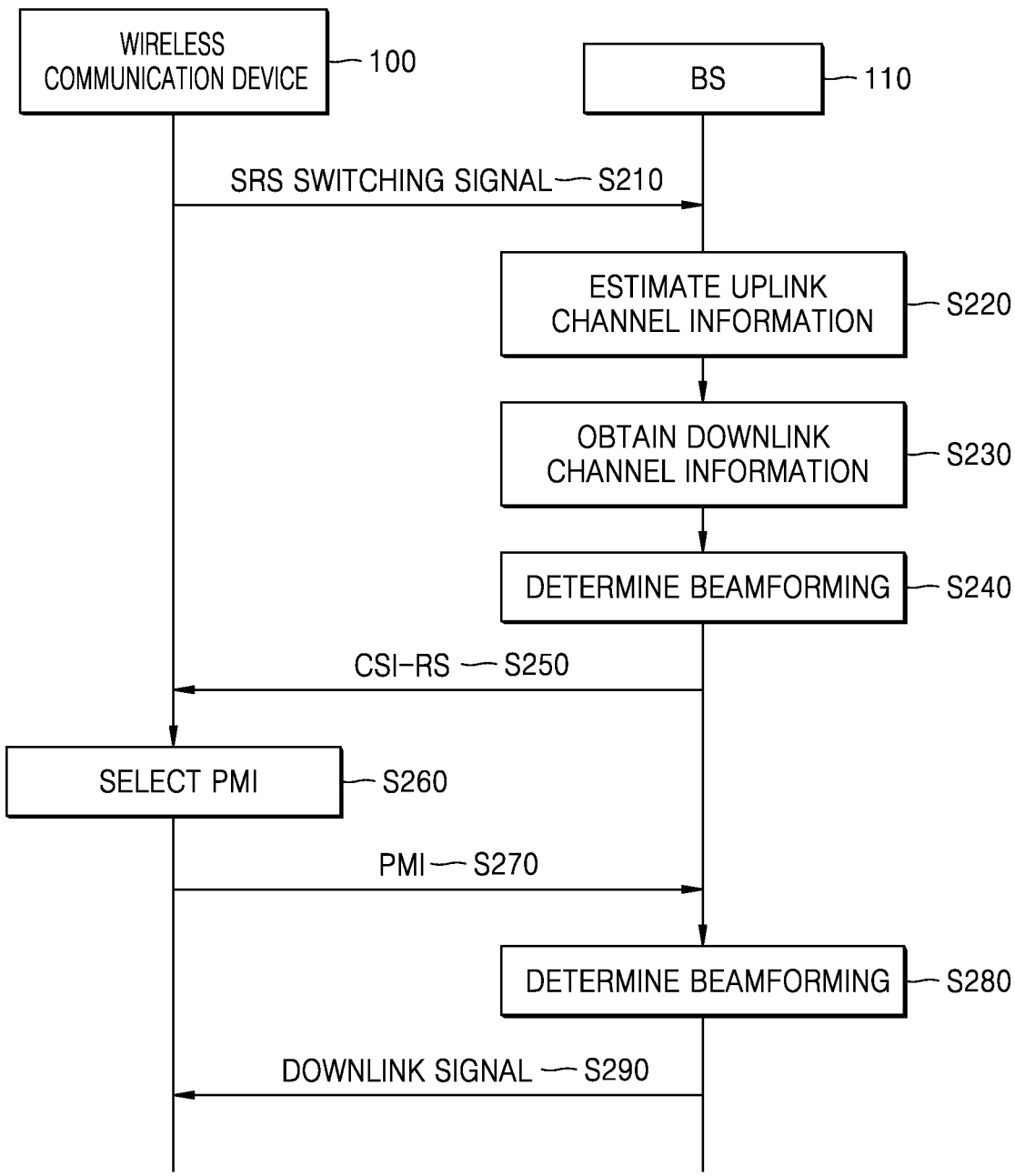

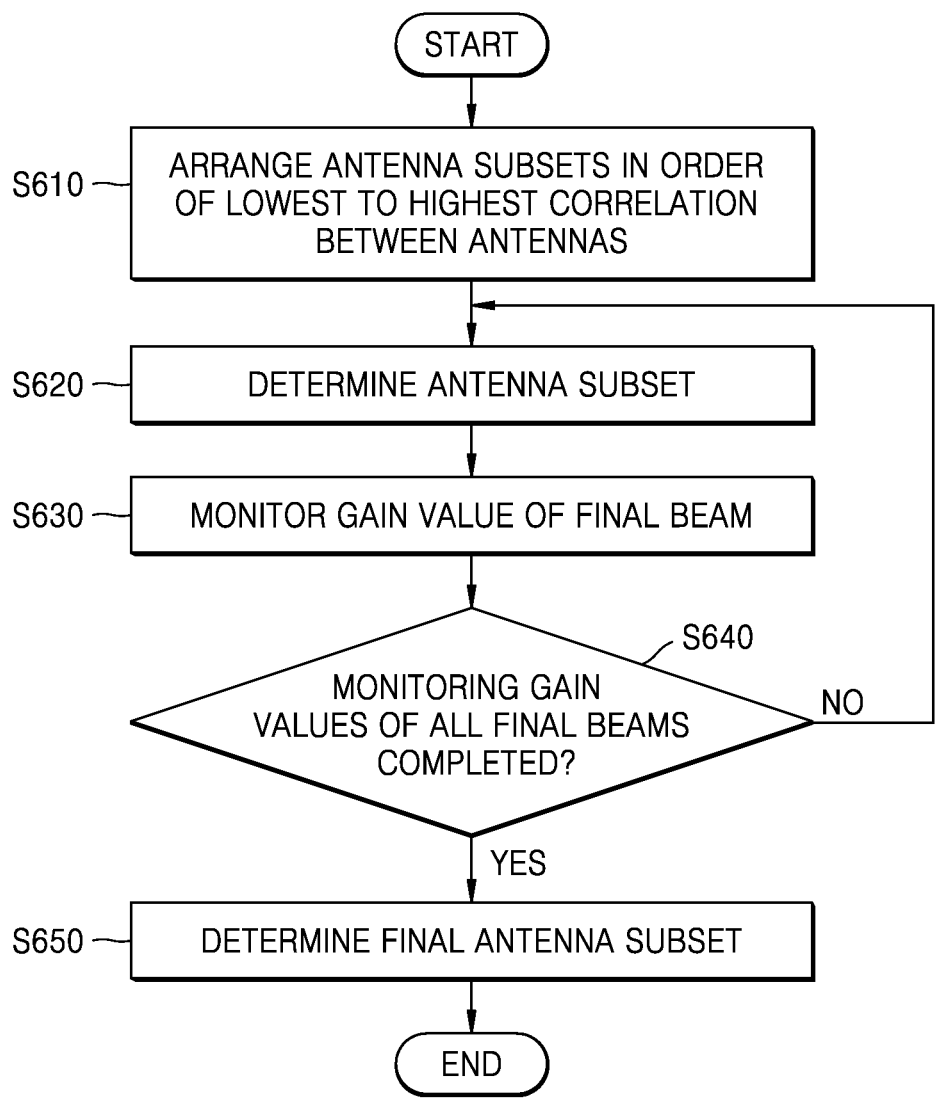

METHOD AND APPARATUS COMMUNICATION USING BEAM-FORMING IN WIRELESS COMMUNICATION SYSTEM

CROSS-REFERENCE TO RELATED APPLICATION

This application is based on and claims priority under 35 U.S.C. § 119 to Korean Patent Application No. 10-2021-0003565, filed on Jan. 11, 2021, in the Korean Intellectual Property Office, the disclosure of which is incorporated by reference herein in its entirety.

TECHNICAL FIELD

The present disclosure relates generally to wireless communication and more particularly to wireless communication using beamforming techniques based on determining channel characteristics.

DISCUSSION OF RELATED ART

Beamforming may refer to a method of transmitting or receiving directional signals using a plurality of antennas. As an example, a base station may transmit a downlink signal to a terminal using a beamforming method. To determine the beam to be formed, the base station may assume that the radio channel between the uplink (terminal to base station) and the downlink (base station to terminal) is reciprocal, that is, a channel reciprocity condition exists. In this case, the base station may transmit the downlink signal using the beamforming method based on a downlink channel condition which is estimated from the uplink signal received from the terminal. However, due to various factors, the uplink and downlink channels may differ, whereby this technique may result in inaccurate downlink channel information, leading to suboptimal beamforming.

SUMMARY

The present disclosure provides a wireless communication method and a wireless communication device for transmitting a "sounding reference signal (SRS) switching signal" by utilizing techniques such as antenna selection or beam selection, to optimize downlink beam determination of a base station.

In one aspect, a method of operating a wireless communication device including a plurality of antennas according to an exemplary embodiment of the present disclosure includes determining an antenna subset including at least one of the plurality of antennas, transmitting an SRS switching signal to a base station through at least one antenna of the antenna subset, receiving a channel state information-reference signal (CSI-RS) transmitted from the base station through a first beam, selecting a precoding matrix indicator (PMI) based on the CSI-RS, transmitting the selected PMI to the base station, and receiving a signal transmitted from the base station through a second beam determined based on the SRS switching signal and the PMI.

In another aspect, a wireless communication device according to an exemplary embodiment of the present disclosure includes a plurality of antennas, a radio-frequency integrated circuit (RFIC) including a switching network connected to a plurality of antennas, a switching network configured to transmit a SRS switching signal to a base station through at least one antenna included in the antenna subset; and a processor configured to determine an antenna subset including at least one of the plurality of antennas, select a PMI to be provided to the base station based on a CSI-RS transmitted using a first beam from the base station, and process a signal transmitted from the base station using a second beam determined based on the SRS switching signal and the PMI.

In still another aspect, a method of operating a base station communicating with a wireless communication device including a plurality of antennas according to an exemplary embodiment of the present disclosure includes receiving a SRS switching signal transmitted using an antenna subset including at least one of the plurality of antennas, estimating uplink channel information based on the SRS switching signal, estimating downlink channel information based on the estimated uplink channel information, determining and forming a first beam based on the estimated downlink channel information. A CSI-RS is transmitted through the first beam, and a PMI is received from the wireless communication device. A second beam is determined and formed based on the received SRS switching signal and the received PMI, and a signal including data is transmitted through the second beam.

In yet another aspect, a method of operating a wireless communication device including a plurality of antennas involves determining an antenna subset including at least two but less than all of the plurality of antennas. An SRS switching signal including a sequence of SRSs is transmitted to a base station, where each of the SRSs is respectively transmitted through a different one of the at least two antennas of the antenna subset. A reference signal, transmitted through a first beam from the base station, is received, and a PMI is selected based on the reference signal. The selected PMI is transmitted to the base station. A signal is thereafter received from the base station, which was transmitted through a second beam determined based on the SRS switching signal and the PMI.

BRIEF DESCRIPTION OF THE DRAWINGS

Embodiments of the inventive concept will be more clearly understood from the following detailed description taken in conjunction with the accompanying drawings in which:

FIG. 2 is a flowchart illustrating a method of operating a wireless communication device and a base station in a wireless communication system according to an exemplary embodiment of the present disclosure;

FIG. 6 is a flowchart illustrating an example of a method of transmitting an SRS switching signal according to an antenna spatial correlation-based selection method according to an exemplary embodiment of the present disclosure;

DETAILED DESCRIPTION OF EMBODIMENTS

Hereinafter, embodiments of the inventive concept will be described in detail with reference to the accompanying drawings.

Figure 1A:
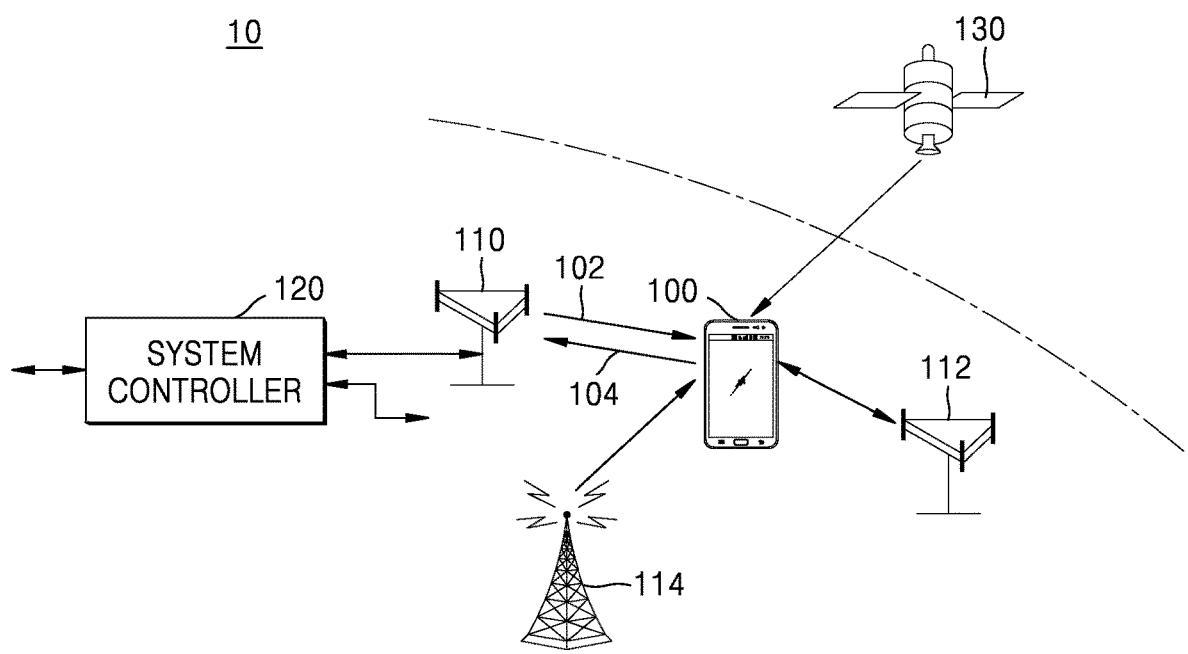
FIG. 1A is a block diagram schematically illustrating a wireless communication system according to an exemplary embodiment of the present disclosure.
Figure 1B:
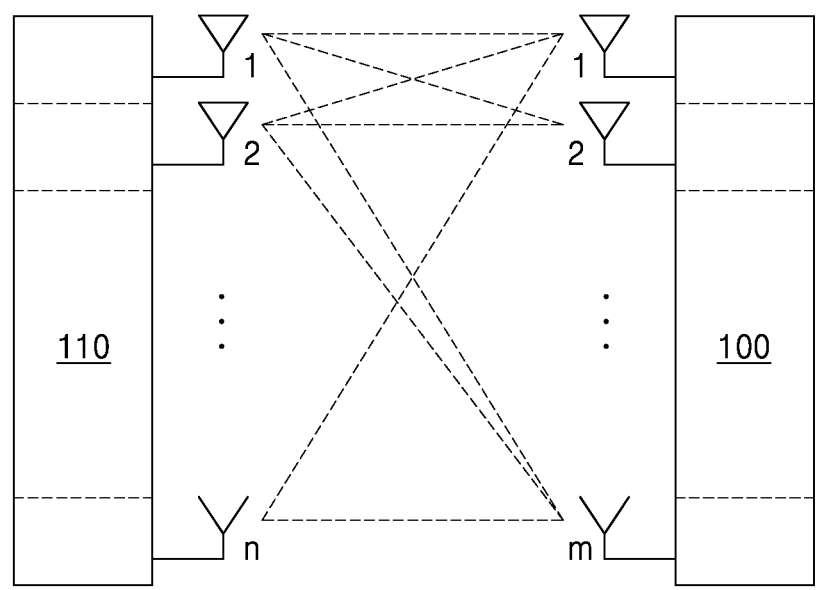
FIG. 1B is a diagram for explaining a radio channel between a wireless communication device and a base station of FIG. 1A.

FIG. 1A is a block diagram schematically illustrating a wireless communication system 10 according to an exemplary embodiment of the present disclosure, and FIG. 1B is a diagram for explaining a radio channel between a wireless communication device 100 and a base station 110 of FIG. 1A.

The wireless communication system 10 may refer to any system including a wireless communication device 100 and a base station 110. For example, the wireless communication system 10 may be any one of a New Radio (NR) system, a 5th generation wireless (5G) system, a Long Term Evolution (LTE) system, an LTE-Advanced system, a Code Division Multiple (CDMA) system, a Global System for Mobile Communication (GSM) system, or a Wireless Local Area Network (WLAN) system. In the case of a CDMA system, this may be implemented in various CDMA versions such as wideband CDMA (WCDMA), time division synchronization CDMA (TD-SCDMA), cdma2000, and the like. Hereinafter, the wireless communication system 10 will be described with reference mainly to a 5G system and/or an LTE system, but it will be understood that exemplary embodiments of the present disclosure are not limited thereto.

The wireless communication network of the wireless communication system 10 may support multiple users to communicate by sharing available network resources. For example, in a wireless communication network, information may be provided with various multiple access methods such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, OFDM-CDMA, and the like.

A base station (BS) 110 may be part of the wireless communication system 10. The BS 110 may typically be a fixed station communicating with multiple user equipments (UEs), but in other examples, user equipment can be configured to function as a base station. The BS 110 may communicate with another BS 112, and may exchange data and control information by communicating with a UE and/or other "cells" (e.g., other BSs that each typically service a certain geographical area). For example, the BS may be referred to as a cell, a Node B, an evolved-Node B (eNB), a next generation Node B (gNB), a sector, a site, a base transceiver system (BTS), an Access Point (AP), a relay node, a remote radio head (RRH), a radio unit (RU), a small cell, and the like. In this specification, the term "BS" may comprehensively signify some areas or functions covered by a Base Station Controller (BSC) in CDMA, a Node-B in WCDMA, an eNB in LTE, a gNB or sector (site) in NR, and the like, and may cover all of various coverage areas such as a megacell, a macrocell, a microcell, a picocell, a femtocell and relay node, an RRH, an RU, and a small cell communication range.

The wireless communication device 100 (hereinafter, interchangeably just "device 100" for brevity) may be a UE in the wireless communication system 10. A "UE" may be stationary or mobile, and may refer to various devices capable of transmitting and receiving data and/or control information by communicating with the BS. For example, a UE may be referred to as a terminal equipment, a mobile station (MS), a mobile terminal (MT), a user terminal (UT), a subscriber station (SS), a wireless device, a handheld device, and the like.

As shown in FIG. 1A, the wireless communication system 10 may include a plurality of BSs, e.g., 110 and 112, and a system controller 120. In other examples, the wireless communication system 10 may include one or more further cells, and a plurality of network entities. The BSs 110 and 112 may communicate with device 100 or another cell to transmit and receive data signals or control information. The wireless communication device 100 may communicate with the wireless communication system 10 and may also receive signals from a broadcast station 114. Furthermore, the wireless communication device 100 may receive a signal from a satellite 130 of a Global Navigation Satellite System (GNSS). Device 100 may support radio technologies for various wireless communication.

Technical aspects of the present disclosure may be applied between communication entities forming an uplink channel and a downlink channel in the wireless communication system 10. Hereinafter, device 100 and the BS 110 will be described as communication entities to which technical aspects of the present disclosure are applied.

A downlink channel 102 and an uplink channel 104 may be formed as a data connection path between device 100 and the BS 110. It may be assumed that the state of the downlink channel 102 and the state of the uplink channel 104 are either the same (a reciprocity condition) or similar. When the downlink and uplink channels are similar, this may be referred to as a "calibratable reciprocity condition" in which a calibration may be performed to effectively achieve reciprocity between the uplink and downlink channels. Hereafter, whether or not calibration is performed, it may be assumed in the following description that reciprocity exists. (non-reciprocity condition). Reciprocity of the downlink channel 102 and the uplink channel 104 may exist in a time division duplex (TDD)-based wireless communication system in which the uplink and the downlink share the same frequency spectrum but uplink and downlink transmissions are separated in the time domain. Reciprocity may also be predicted or achieved via calibration in a frequency division duplex (FDD)-based wireless communication system in which the uplink and downlink use a different frequency spectrum.

The BS 110 may receive a Sounding Reference Signal (SRS) transmitted through at least one of a plurality of antennas included in device 100. In embodiments of the present disclosure, the BS 110 typically receives a sequence of SRSs from at least two of device 100's antennas (a subset of the antennas), where each antenna transmits one SRS of the sequence. This sequence of SRSs may be referred to as an "SRS switching signal". For example, when device 100 includes a plurality of antennas, at least two of the antennas may be sequentially selected in a predetermined order and each may transmit an SRS, which may be received by the BS 110 and in some cases by cells. The BS 110 may estimate the uplink channel 104 for each antenna of device 100 and estimate downlink channel information using the estimated uplink channel assuming channel reciprocity.

However, even if a transmitter or a receiver is calibrated to satisfy channel reciprocity, channels through which uplink and downlink signals are transmitted and received may be different due to an implementation problem of device 100. For example, if the number of transmit/receive antennas of the terminal is different from the number of transmit/receive RF chains, or if there is a restriction on the SRS resource allocated from the BS 110, in conventional systems, the BS 110 is unable to obtain complete downlink channel information from the signal received from device 100.

In addition, when the BS 110 limits SRS resources per device to support multi-user Multiple Input Multiple Output (MU-MIMO), device 100 is assigned a limited SRS resource, e.g., using less frequencies and/or time slots for channel measurements as compared to an unrestricted SRS resource situation. When SRS is transmitted in a conventional manner using limited resources, beamforming using downlink channel information obtained by the BS 110 may be suboptimal.

The wireless communication system 10 according to an exemplary embodiment of the present disclosure efficiently transmits the SRS using an antenna or beam selection method of device 100 and efficiently acquires a downlink channel, resulting in beamforming-based communication with improved performance.

Referring further to FIG. 1B, device 100 may include m antennas 1 to m, and the BS 110 may include n antennas 1 to n. Device 100 and the BS 110 may perform mutual beamforming-based communication, Multi-Input and Multi-Output (MIMO)-based communication, and the like using respective antennas. Because the theoretical channel transmission capacity is increased through the configuration of FIG. 1B, a transfer rate may be improved and frequency efficiency may be significantly improved.

The uplink channel $h_j$ (1≤j≤m, j is an integer) corresponding to the j-th antenna of the wireless communication device 100 may include channels $h_{1,j}, h_{2,j}, \ldots, h_{n,j}$ corresponding to the respective n antennas of the BS 110. The BS 110 may receive the SRS transmitted from the j-th antenna of device 100 and estimate the uplink channel $h_j$ using the received SRS. The BS 110 may estimate a downlink channel from the uplink channel $h_j$ assuming channel reciprocity, generate a downlink signal using the estimated downlink channel, and transmit a downlink signal to device 100 through at least one of the n antennas.

Descriptions of the uplink channel $h_j$ corresponding to the j-th antenna of device 100 may be applied to uplink channels corresponding to other antennas of device 100, and based on the above, technical concepts of the present disclosure will be described below.

It is noted, throughout the specification, the terms "antenna selection" and "beam selection" may be used interchangeably. Some technical concepts of the present disclosure will be described below mainly with the use of "antenna selection".

FIG. 2 is a flowchart illustrating a method of operating device 100 and the BS 110 in a wireless communication system according to an exemplary embodiment of the present disclosure. In the method, the wireless communication system 10 may include device 100 and the BS 110, and in operation S210, device 100 may transmit an "SRS switching signal" to the BS 110 using the SRS switching resource set by the BS 110. (Device 100 may have learned of the SRS switching resource during a prior signal exchange with the BS 110.) As noted earlier, an SRS switching signal includes a plurality of SRSs transmitted in a sequence, where each SRS is transmitted from a respective one of the device 100's antennas. The "SRS switching resource" may be defined as set of uplink resource elements (REs) (e.g., set of frequencies and/or time slots for SRS transmissions) used when device 100 transmits an SRS signal for the purpose of obtaining channel information for downlink beamforming by the BS 110. The BS 110 may allocate SRS switching resources to device 100.

According to one embodiment, the available resources of the BS 110 are limited for the transmission of the SRS switching signal. In this scenario, there are less SRS switching resources allocated by the BS 110 for the SRS switching signal than the number of reception antennas of device 100. In this case, only some antennas are used for transmission ("the first scenario"). For example, supposing there are 5 wireless communication devices in a cell covered by the BS 110 and that 4 antennas are included in each wireless communication device 100, if there are 16 resources that may be allocated by the BS 110, some of the 5 wireless communication devices cannot be allocated 4 SRS switching resources (assuming switching resources that are to be utilized simultaneously).

In another situation, due to a limitation in hardware implementation of the wireless communication device 100 when transmitting the SRS switching signal, there may be a scenario in which only some antennas are used for transmission ("the second scenario"). This corresponds to a case where the number of Tx radio frequency (RF) chains of device 100 is less than the number of reception antennas of 100. For example, due to a limitation in hardware implementation of device 100, the number of reception antennas is four but the number of transmission antennas may be limited to two.

In the following discussion, to facilitate understanding of concepts taught herein, an example is presented in which device 100 has four reception antennas. In other examples, the concepts are applied to a device 100 having more or fewer antennas.

Operations of antenna selection and antenna switching will be described below with further reference to FIGS. 3A and 3B.

In operation S220, the BS 110 may estimate uplink channel information based on the received SRS switching signal. In operation S230, the BS 110 may estimate downlink channel information by performing an operation such as calibration from the estimated uplink channel information. Here, calibration refers to a series of processes in which uplink and downlink channels are corrected to satisfy reciprocity in an entire signal path, e.g., baseband on transmit to baseband on receive through an RF filter. The BS 110 may determine beamforming using the downlink channel information estimated in operation S240, and transmit a channel state information-reference signal (CSI-RS) using beamforming in operation 250. Depending on which antenna(s) is selected, the CSI-RS transmitted by the BS 110 to device 100 may include different information.

Device 100 may select a pre-coding matrix indicator (PMI) based on the CSI-RS received in operation S260, and transmit the PMI selected in operation S270 to the BS 110. When selecting a PMI, device 100 may consider information on a selected antenna(s), and accordingly, may select an optimal PMI.

In operation S280, the BS 110 may determine the final downlink beamforming using information obtained from the SRS switching signal received in operation S210 and the information obtained from the PMI received in operation S270, and transmit a downlink signal including data or the like through an antenna beam determined by the beamforming in operation S290.

The beam determined in operation S280 may be referred to as a "final beam" hereinafter, and may be defined in the form of a matrix as follows.

$$x = F_{SRS} F_{PMI} s \quad \text{[Equation 1]}$$

$F_{SRS}$ (the number of antennas of the BS 110×the number of CSI-RS antenna ports) may be defined as a matrix for a beam based on the SRS switching signal received from device 100, and $F_{PMI}$ (the number of CSI-RS antenna ports×the number of data layers or data streams) may be defined as a matrix for a beam based on a PMI received from device 100. s (the number of data layers or data streams×1) may be defined as a matrix for a downlink signal including data that the BS 110 is to transmit to device 100.

The BS 110 may form a finally synthesized beam using all of the information obtained from the SRS switching signal and the PMI, and may perform beamforming with device 100. $F_{SRS}$ and $F_{PMI}$ may be expressed as $F_{SRS\_PMI}$, which is a matrix for the finally synthesized beam, that is, in the form of one beam. x (the number of BS antennas×1) corresponds to the final signal transmitted from the BS 110 to device 100.

According to the above operation method, device 100 adaptively transmits the SRS switching signal and adaptively transmits the PMI to optimize the acquisition of downlink channel information and the beamforming decision of the BS 110.

Meanwhile, the CSI-RS corresponding to the downlink reference signal and the SRS corresponding to the uplink reference signal described with reference to FIG. 2 are only examples of reference signals that may be applied in the method. Alternative reference signals may include a pilot signal transmitted by a BS in a downlink for channel estimation and a pilot signal transmitted in an uplink by a wireless communication device for channel estimation.

Figure 3A:
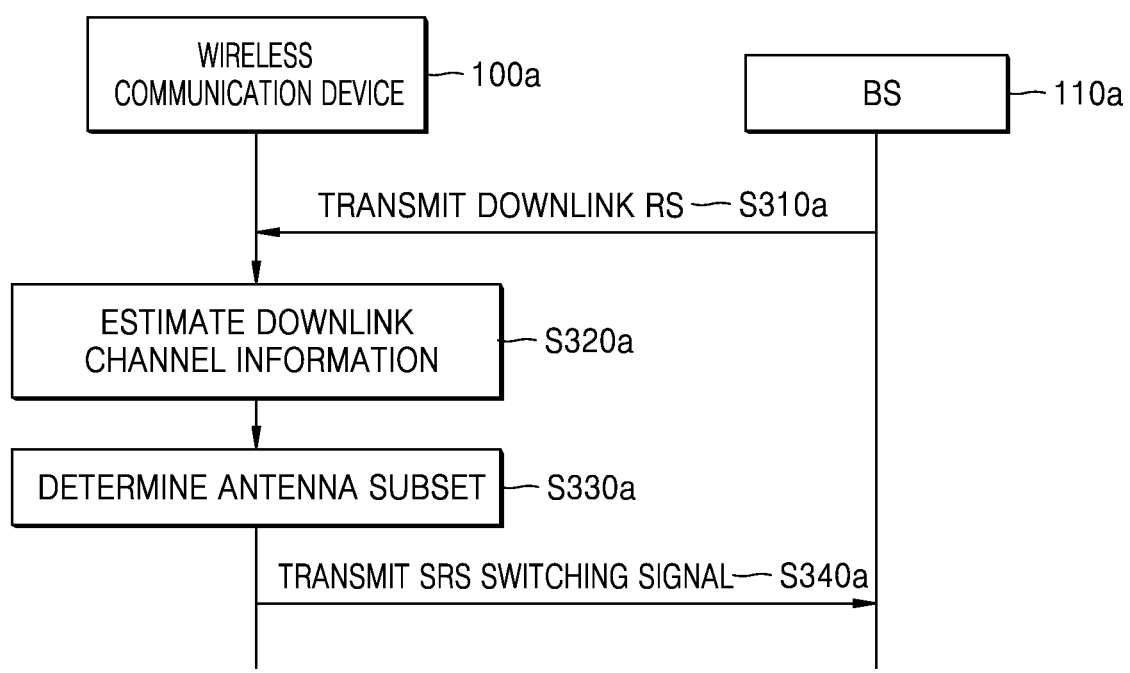
FIGS. 3A and 3B are flowcharts illustrating respective examples of a method of transmitting a sounding reference signal (SRS) switching signal according to exemplary embodiments of the present disclosure.
Figure 3B:
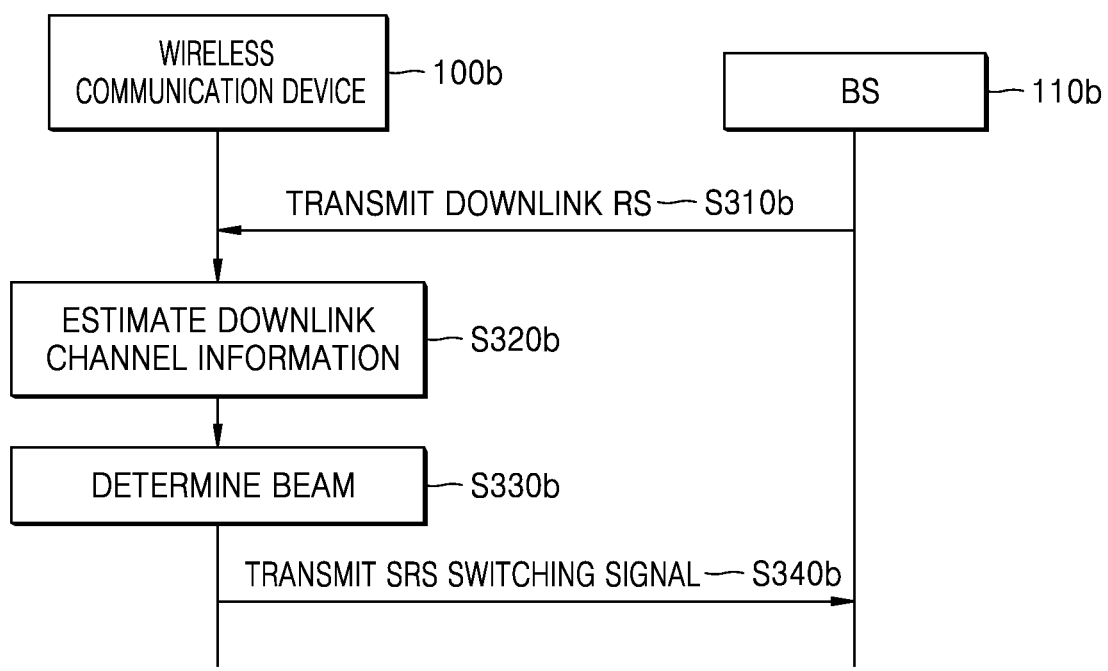

FIGS. 3A and 3B are flowcharts illustrating examples of a method of transmitting an SRS switching signal according to exemplary embodiments of the present disclosure.

FIG. 3A illustrates a process of determining an antenna subset to select an antenna for transmitting an SRS switching signal in operation S210 of FIG. 2.

In operation S310a, a BS 110a may transmit a downlink reference signal to a wireless communication device 100a (hereafter, "device 100a"). Device 100a may estimate the downlink channel information from the received CSI-RS in operation S320a, and determine the antenna subset based on the estimated downlink channel information in operation S330a. The antenna subset may be determined based on at least one of a signal to interference plus noise ratio (SINR) of the wireless communication device, a transmission/reception characteristic of an antenna, and a linearity of a transmission power amplifier. In operation S340a, device 100a may transmit the SRS switching signal through at least one of antennas included in the determined antenna subset.

In an exemplary embodiment, a method of determining an antenna subset may include a method of sequentially determining the antenna subset and then switching the antenna subset according to the transmission period of the SRS switching signal, a method of aperiodic switching of the antenna subset after determining an antenna subset based on a gain value of/signal quality metric for a specific beam, a method of switching an antenna subset after determining an antenna subset according to spatial correlation between reception antennas of a wireless communication device, and a method of switching antenna subsets according to an update period after determining an antenna subset based on reinforcement learning. Detailed descriptions of this are provided below with reference to FIG. 4.

Referring to FIG. 3B, a process of selecting a beam to transmit an SRS switching signal in operation S210 of FIG. 2 is illustrated.

In operation S310b, a BS 110b may transmit a downlink reference signal to a wireless communication device 100b ("device 100b"). Device 100b may estimate the downlink channel information from the received CSI-RS in operation S320b, and determine a beam for transmitting the SRS switching signal from each antenna based on the estimated downlink channel information in operation S330b. For instance, 100b selects a beam with good reception performance and spatial characteristics from a previously designed beam code-book using the estimated downlink channel information, or may be newly designed when there is no pre-designed beam codebook. In operation S340b, the SRS switching signal may be transmitted using the determined beam.

Table 1 below shows a beam codebook according to an embodiment of the present disclosure.

TABLE 1

|  | Beam#1 | Beam#2 | Beam#3 | Beam#4 |
| --- | --- | --- | --- | --- |
| Antenna#1 | A11 + B11i | A12 + B12i | A13 + B13i | A14 + B14i |
| Antenna#2 | A21 + B21i | A22 + B22i | A23 + B23i | A24 + B24i |
| Antenna#3 | A31 + B31i | A32 + B32i | A33 + B33i | A34 + B34i |
| Antenna#4 | A41 + B41i | A42 + B42i | B43 + B43i | A44 + B44ii |

Referring to Table 1, in this example it is assumed there are four antennas of device 100b and four beams that may be formed from each antenna. For example, the beam codebook includes an index of a precoding matrix shared in advance in device 100b and the BS 110b. Elements of each antenna for beam configuration may be expressed as arbitrary complex values. For example, the real component for the second beam of Antenna #4 is A42 and the imaginary component is B42.

Table 2 below shows a beam codebook according to an embodiment of the present disclosure.

TABLE 2

|  | Beam#1 | Beam#2 | Beam#3 | Beam#4 |
| --- | --- | --- | --- | --- |
| Antenna#1 | 1 | 1 | 1 | 1 |
| Antenna#2 | 1 | −1i | −1 | 1i |
| Antenna#3 | 1 | −1 | 1 | −1 |
| Antenna#4 | 1 | 1i | −1 | −1i |

Referring to Table 2, among the elements of the third antenna for configuring the beam, an element for the third beam may be composed of 1.

Figure 4:
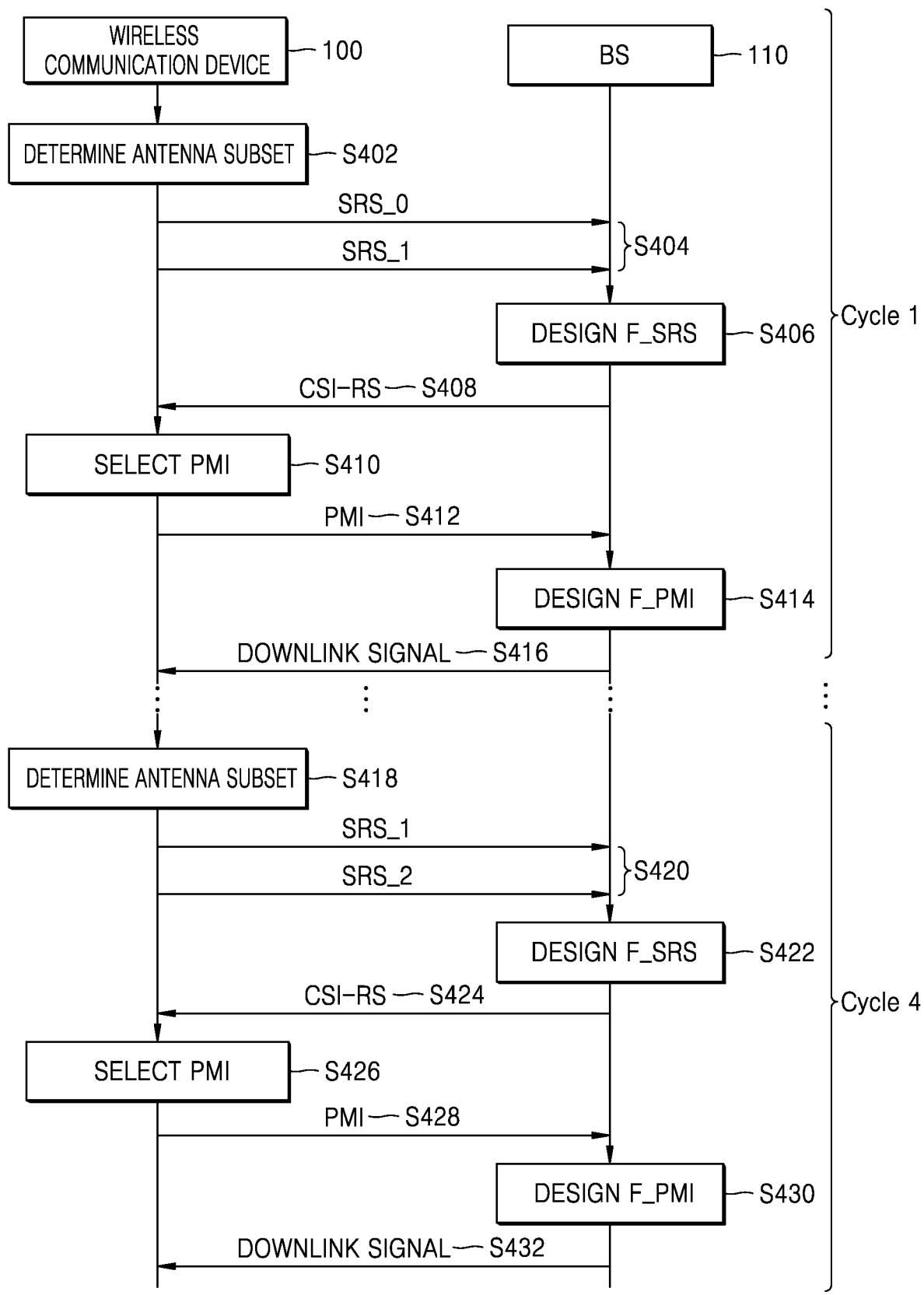
FIG. 4 is a flowchart illustrating an example of a method of transmitting an SRS switching signal according to a sequential antenna selection method according to an exemplary embodiment of the present disclosure.

FIG. 4 is a flowchart illustrating an example of a method of transmitting an SRS switching signal according to a sequential antenna selection method according to an exemplary embodiment of the present disclosure.

The example of FIG. 4 shows a method of transmitting an SRS switching signal according to a method of sequentially determining an antenna subset and then switching the antenna subset according to an SRS transmission period. This may be referred to as a "sequential antenna selection method".

In FIG. 4, it is assumed that the number of reception antennas of device 100 is 4, and an SRS switching signal is transmitted to the BS 110 by using two transmission antennas that are less than the number of reception antennas. That is, it is assumed that the size of the antenna subset determined by device 100 is 2. For example, this correspond to a case where only two antennas are used when the BS 110 allocates two SRS switching resources to device 100 (first scenario), or due to a hardware implementation limitation of device 100.

In an embodiment, when the indices of the first antenna, the second antenna, the third antenna, and the fourth antenna are {0, 1, 2, 3}, respectively, a subset consisting of a combination of two antennas for transmitting an SRS switching signal among the first to fourth antennas may be configured as follows.

Antenna subset: {0, 1} {0, 2} {0, 3} {1, 2} {1, 3} {2, 3}

In an exemplary embodiment, device 100 may sequentially determine each of the six possible antenna subsets in a predefined order.

Here, the fact that the antenna subset is sequentially determined, for example, means that the six possible antenna subsets are sequentially selected for each transmission period of the SRS switching signal among {0, 1} {0, 2} {0, 3} {1, 2} {1, 3}, and {2, 3}.

For example, in operation S402, 100 may determine an antenna subset to transmit the SRS switching signal as {0, 1} in the first SRS switching transmission period. That is, device 100 may determine to transmit the SRS switching signal by using the first antenna and the second antenna among the four antennas. In some embodiments, device 100 may determine each of the antenna subsets in a different order than that described above.

In operation S404, after transmitting SRS_0, which is an SRS switching signal using the first antenna, and SRS_1, which is an SRS switching signal using a second antenna, the BS 110 may design a downlink beam F_SRS using SRS_0 and SRS_1 in operation S406. The BS 110 may transmit the CSI-RS through the F_SRS beam in operation S408.

Device 100 may select a PMI based on the CSI-RS received in operation S410, and feed back the PMI to the BS 110 in operation S412. The BS 110 may design the downlink beam F_PMI using the PMI received in operation S414, and transmit a downlink signal including data to device 100 by using the final beam determined by F_SRS and F_PMI in operation S416.

As an exemplary embodiment, operations S402 to S416 may be performed by device 100 for a time corresponding to the first SRS switching signal transmission period, and may be referred to as Cycle 1. In the second SRS switching signal transmission period corresponding to Cycle 2, the antenna subset {0, 2} is determined to transmit the SRS switching signal, and for example, in Cycle 4 corresponding to the fourth SRS switching signal transmission period, the antenna subset {1, 2} is determined to transmit SRS_1 and SRS_2 to the BS 110.

In operation S418, device 100 may determine an antenna subset to transmit the SRS switching signal as {1, 2} in the fourth SRS switching transmission period after several SRS switching transmission periods are repeated. That is, device 100 may determine to transmit the SRS switching signal by using the second antenna and the third antenna among the four antennas. In some embodiments, device 100 may determine each of the antenna subsets in a different order than that described above.

In operation S420, after transmitting SRS_0, which is an SRS switching signal using the first antenna, and SRS_1, which is an SRS switching signal using a second antenna, the BS 110 may design a downlink beam F_SRS using SRS_0 and SRS_1 in operation S422. The BS 110 may transmit the CSI-RS through the F_SRS beam in operation S424.

Device 100 may select a PMI based on the CSI-RS received in operation S426, and feed back the PMI to the BS 110 in operation S428. The BS 110 may design the downlink beam F_PMI using the PMI received in operation S430, and transmit a downlink signal including data to the wireless communication device 100 by using the final beam determined by F_SRS and F_PMI in operation S432.

According to the method shown in FIG. 4, device 100 may monitor the "gain" of the final beam at every SRS switching signal transmission period and sequentially consider all possible antenna subsets to find an optimal antenna combination. Here, "beam gain" or just "gain" or "gain value" may be defined as a relative term (since the distance between the BS 110 and device 100 is typically unknown) for signal quality of the signal transmitted by an antenna beam transmitted from a base station and received by a wireless communication device (e.g., 100). Hereafter, the terms "gain" and "signal quality" may be used interchangeably. Gain may be determined by the power of a signal received by device 100, a signal to noise ratio (SNR) of the signal received by device 100, a signal to noise and interference ratio (SINR) or the signal received by device 100, and/or frequency efficiency.

According to embodiments of the present disclosure, an antenna subset finally selected as an optimal antenna combination may be referred to as a "final antenna subset".

Note that in the above example, an antenna subset size of 2 was used to aid in understanding concepts taught herein. In other examples, more or fewer antennas may form an antenna subset.

Figure 5A:
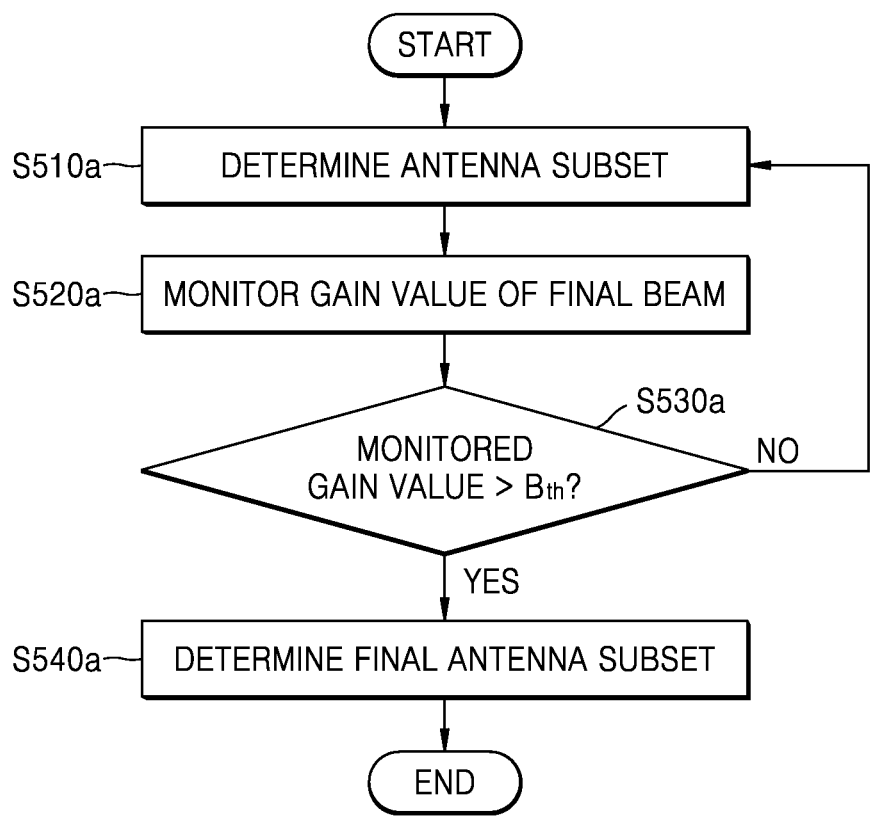
FIGS. 5A and 5B are flowcharts illustrating examples of a method of transmitting an SRS switching signal according to an opportunistic antenna selection method according to exemplary embodiments of the present disclosure.
Figure 5B:
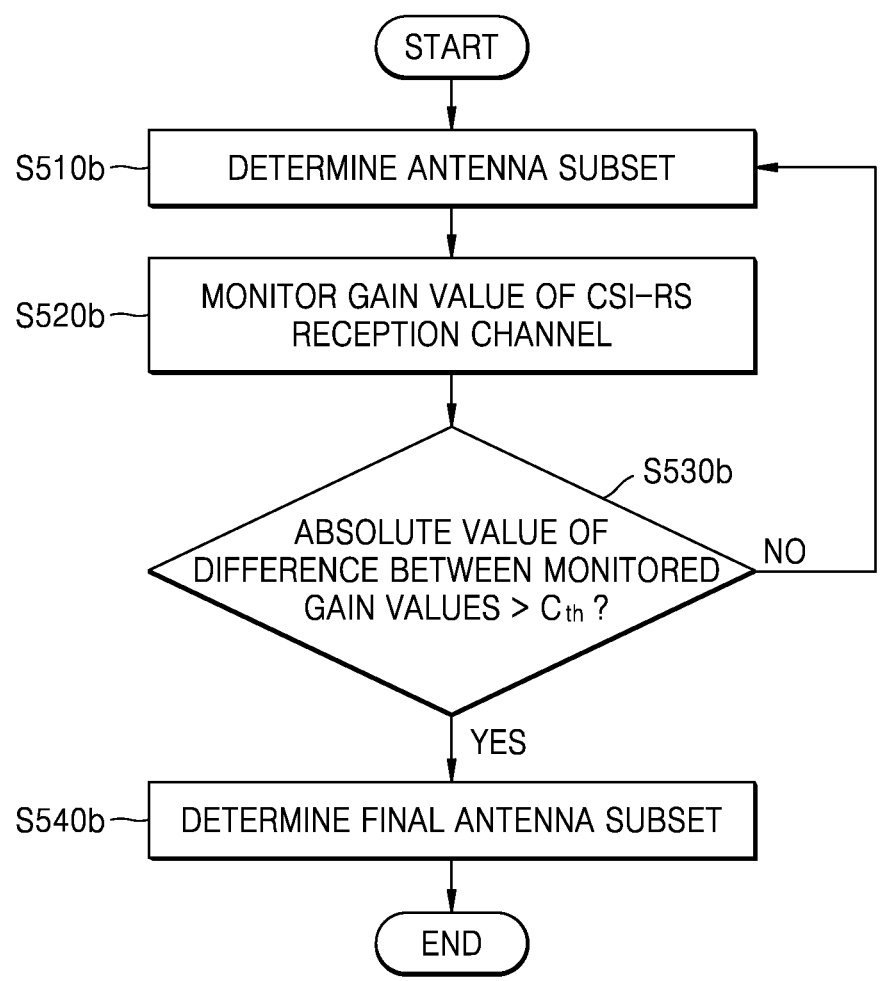

FIGS. 5A and 5B are flowcharts illustrating examples of a method of transmitting an SRS switching signal according to an opportunistic antenna selection method according to exemplary embodiments of the present disclosure.

FIG. 5A illustrates a method of transmitting an SRS switching signal according to a method of aperiodic switching of the antenna subset after determining an antenna subset based on a gain value of a specific beam. This may be referred to as one of the "opportunistic antenna selection methods".

In the opportunistic antenna selection method, a specific value corresponding to the gain value of the beam is preset as a threshold value $B_{th}$, and when it is determined that the gain value of the final beam determined as an arbitrary antenna subset is less than the threshold value, regardless of the order, it may immediately decide to a different antenna subset. When it is determined that the gain value of the final beam determined as an arbitrary antenna subset is greater than the threshold value, the process for determining another antenna subset and transmitting the SRS switching signal may be stopped, and a corresponding antenna subset may be declared as an optimal antenna combination. That is, the corresponding antenna subset may be determined as the "final antenna subset".

Meanwhile, after the final antenna subset is determined, device 100 may track an optimal antenna combination with an arbitrary tracking period. There may be a method of changing one antenna included in the previously determined final antenna subset, and there may be a method of changing one or more antennas. When the gain of the final beam is rapidly lowered, an antenna included in the previously determined final antenna subset may not be selected, or the final antenna subset itself may be replaced with another antenna subset. Tracking and a tracking period may be determined from an indicator related to a change in a radio channel.

Specifically, referring to FIG. 5A, device 100 may determine an arbitrary antenna subset for transmitting the SRS switching signal in operation S510a, and after operation S510a, operations S210 to S290 described with reference to FIG. 2 may be performed, and detailed information thereof will be omitted.

In operation S520a, device 100 may monitor the gain value of the final beam received in operation S290, as an exemplary embodiment. In operation S530a, device 100 may determine whether the gain value of the monitored final beam exceeds the threshold value $B_{th}$.

In operation S540a, when the gain value of the final beam monitored by device 100 exceeds the threshold value $B_{th}$, the antenna subset determined in operation S510a may be determined as the final antenna subset.

On the other hand, when the gain value of the final beam monitored by device 100 is less than or equal to the threshold value $B_{th}$, the process returns to operation S510a of determining an antenna subset. For example, device 100 may return to operation S510a, select an antenna subset {2, 3}, and transmit the SRS switching signal using the third antenna and the fourth antenna.

FIG. 5B illustrates a method of transmitting an SRS switching signal according to a method of aperiodic switching of the antenna subset after determining an antenna subset based on the values of channel gains corresponding to all antennas for a channel receiving CSI-RS. This may be referred to as one of the "opportunistic antenna selection methods".

In an embodiment, when channel gains corresponding to all antennas for a channel receiving a CSI-RS have similar values, device 100 may determine the antenna subset determined in an operation akin to S510b as the final antenna subset. The criterion for whether channel gains have similar values may be set differently according to embodiments.

On the other hand, when the channel gains corresponding to all antennas for the channel receiving the CSI-RS have a relatively large difference, device 100 may return to an operation akin to S510b of determining the antenna subset and continuously attempt to transmit the SRS switching signal using the new antenna subset.

Device 100 may determine an arbitrary antenna subset for transmitting the SRS switching signal in operation S510b, and after operation S510b, operations S210 to S290 described with reference to FIG. 2 may be performed (detailed descriptions thereof are omitted here).

In operation S520b, device 100 may monitor a gain value of a channel that receives a CSI-RS in operation S290, as an exemplary embodiment. In operation S530b, device 100 may determine whether the absolute value of the difference between the monitored channel gain values exceeds the threshold value $C_{th}$.

When the absolute value of the difference between the gain values of the channel monitored in operation S520b exceeds the threshold value $C_{th}$, in operation S540b, device 100 may determine the final antenna subset as the antenna subset determined in operation S510b.

On the other hand, when the gain value of the final beam monitored by device 100 is less than or equal to the threshold value $B_{th}$, the process returns to operation S510b of determining an antenna subset. For example, device 100 may return to operation S510b, select an antenna subset {2, 3}, and thereafter, periodically or continuously transmit the SRS switching signal using the third antenna and the fourth antenna.

Meanwhile, after the final antenna subset is determined, device 100 may track an optimal antenna combination with an arbitrary tracking period. This may employ a method of changing one antenna included in the previously determined final antenna subset, or a method of changing one or more antennas. During tracking, when the gain of the final beam is rapidly lowered, an antenna included in the previously determined final antenna subset may not be selected, or the final antenna subset itself may be replaced with another antenna subset. Tracking and a tracking period may be determined from an indicator related to a change in a radio channel.

FIG. 6 is a flowchart illustrating an example of a method of transmitting an SRS switching signal according to an antenna spatial correlation-based selection method according to an exemplary embodiment of the present disclosure.

Specifically, FIG. 6 illustrates a method of transmitting an SRS switching signal according to a method of switching an antenna subset ("Method 3") after determining an antenna subset according to spatial correlation between reception antennas of a wireless communication device. Method 3 may be referred to as "an antenna spatial correlation-based selection method".

Spatial correlation between antennas may be defined as an index indicating the degree of interference between antennas determined by factors such as a distance between antennas. For example, when the spatial correlation between antennas is low, different signals may be independently transmitted through the antennas. Accordingly, low spatial correlation between antennas is desirable for an antenna subset of an SRS switching signal according to embodiments of the present disclosure. A method of considering spatial correlation between antennas may have an objective of transmitting a signal through an antenna that guarantees a relatively independent channel by selecting a combination of antennas according to channel information.

Spatial correlation between antennas may be determined by a frequency band, a cell type covered by the BS, a separation distance between antennas, polarization, and the like.

According to an embodiment, antenna subsets may be arranged in an order of lowest to highest spatial correlation between reception antennas of device 100 and then sequentially determined as an antenna subset to transmit the SRS switching signal.

Alternatively, antenna subsets may be arranged in an order of highest to lowest spatial correlation between reception antennas of device 100 and then sequentially determined as an antenna subset to transmit the SRS switching signal.

In another embodiment, the antenna subset may be switched considering the arrangement of a plurality of antennas of device 100 without measuring spatial correlation. For example, antenna subsets may be arranged from the antenna combinations having the largest antenna separation distance values in the following order.

Antenna subset: {0, 3} {0, 2} {1, 3} {0, 1} {1, 2} {2, 3}

Referring to FIG. 6, in operation S610, device 100 may arrange antenna subsets in an order of low correlation between antennas. In operation S620, one of the antenna subsets listed in operation S610 is sequentially selected and determined as the i-th antenna subset. After operation S620, operations S210 to S290 described with reference to FIG. 2 may be performed (redundant descriptions thereof are omitted).

In operation S630, device 100 monitors the gain value of the final beam. For example, assuming that the number of antennas included in device 100 is 4 and the antenna subset is a combination of two antennas, there are a total of six possible antenna subsets, and operations S620 to S630 are repeated a total of six times.

When monitoring of the final beam gain value for all antenna subsets is complete, in operation S640, the antenna subset having the largest gain value may be determined as the final antenna subset.

Meanwhile, after the final antenna subset is determined, device 100 may track an optimal antenna combination with an arbitrary tracking period. This may employ a method of changing one antenna included in the previously determined final antenna subset, or a method of changing one or more antennas. During tracking, when the gain of the final beam is rapidly lowered, an antenna included in the previously determined final antenna subset may not be selected, or the final antenna subset itself may be replaced with another antenna subset. Tracking and a tracking period may be determined from an indicator related to a change in a radio channel.

Also, according to one embodiment, if there is one SRS switching resource allocated by the BS 110 for the SRS switching signal according to the "first scenario" (mentioned earlier), after determining the antenna subset based on the reception performance of the antenna, device 100 may switch the antenna subset to transmit the SRS switching signal. For example, antenna subsets may be sequentially determined after antennas having high antenna reception power are arranged in ascending order or antennas having small antenna reception power are arranged in ascending order.

Figure 7A:
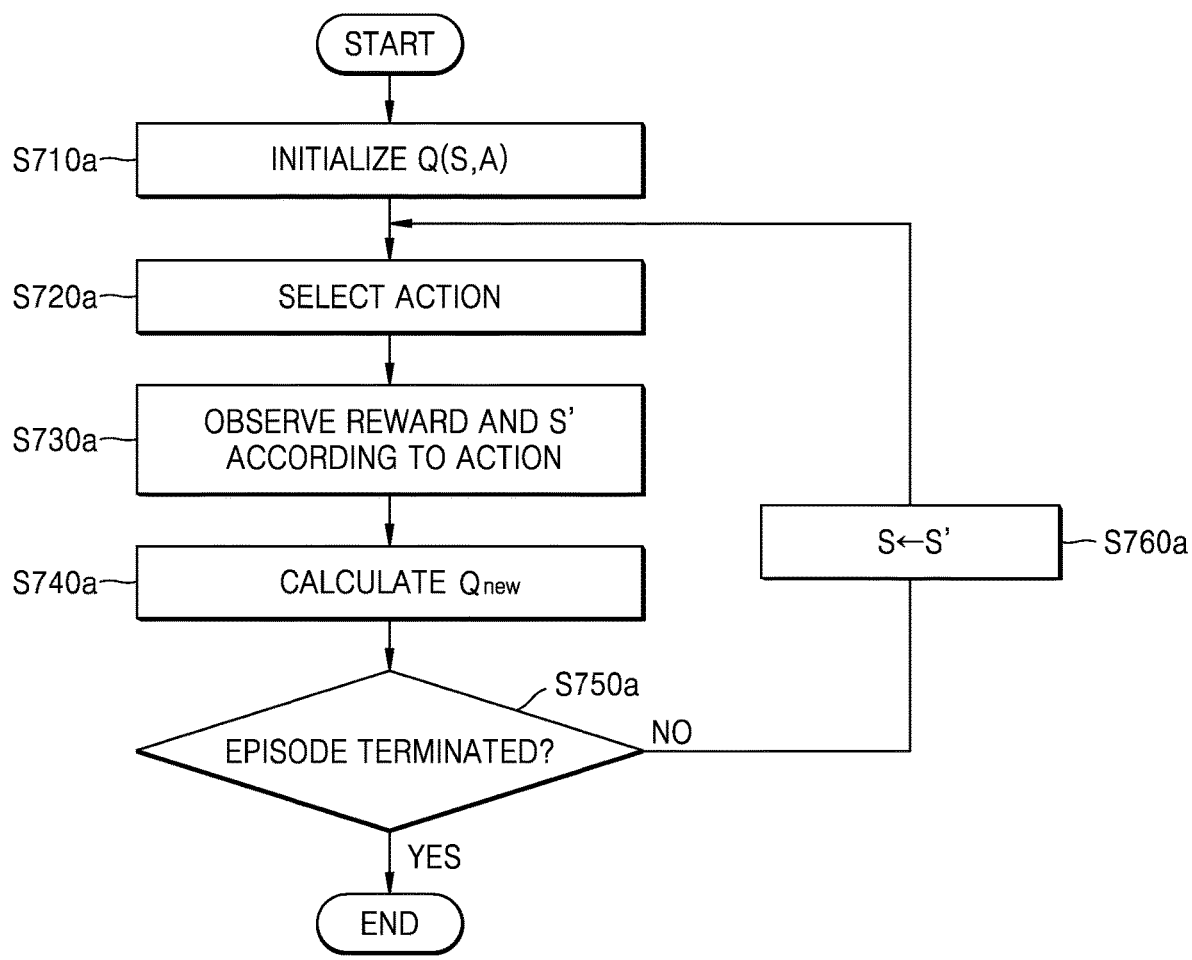
FIGS. 7A, 7B and 7C are flowcharts illustrating examples of a method of transmitting an SRS switching signal according to an antenna selection method based on reinforcement learning according to exemplary embodiments of the present disclosure.
Figure 7B:
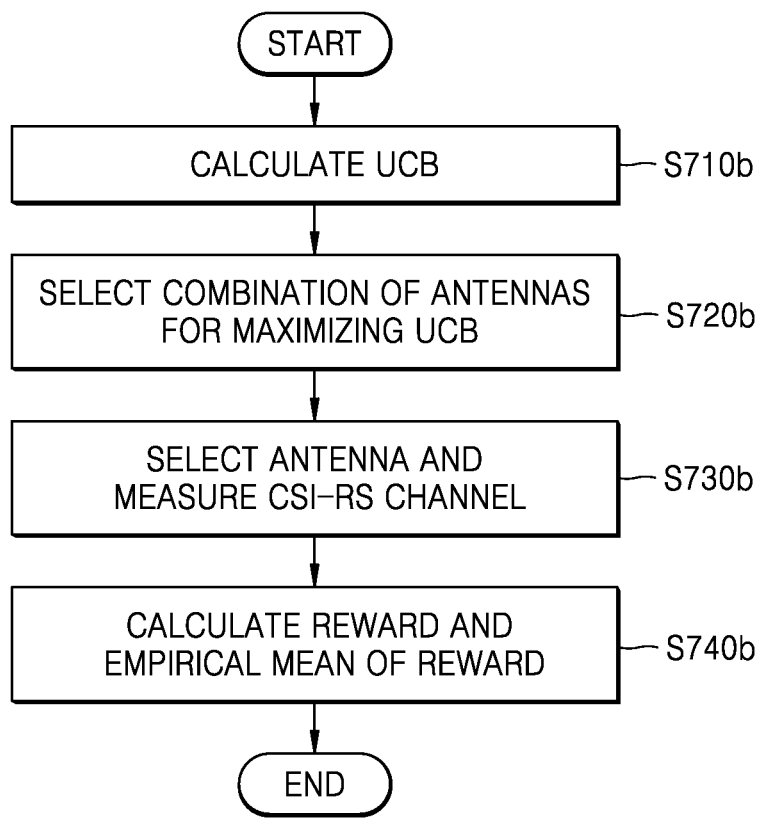
Figure 7C:
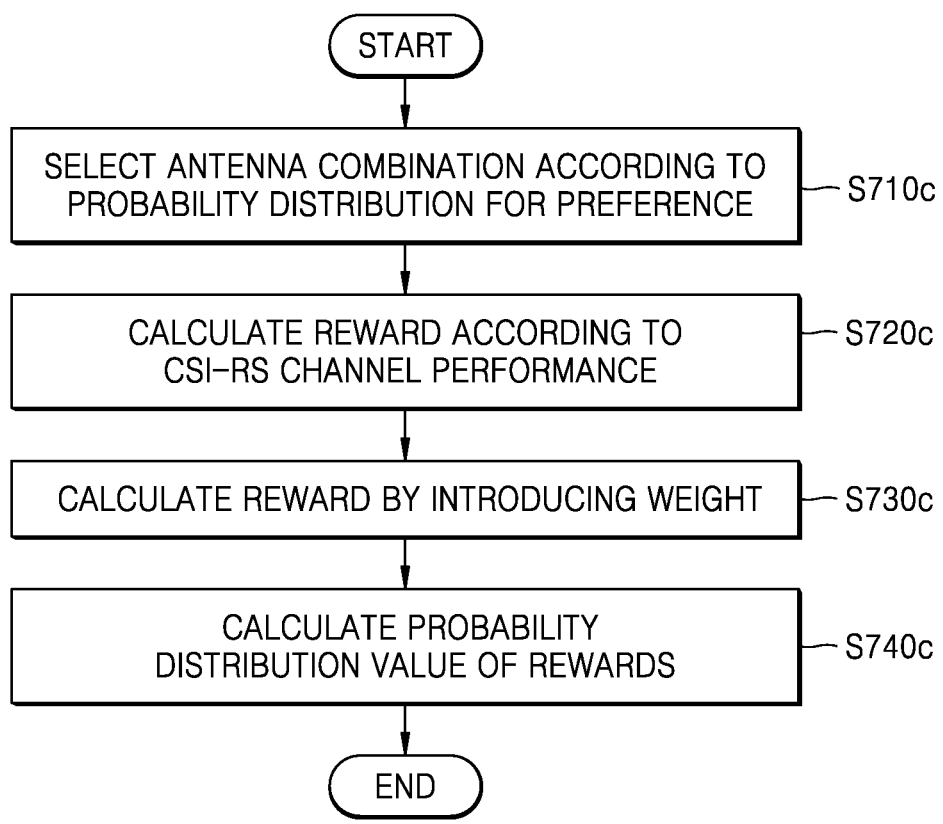

FIGS. 7A to 7C are flowcharts illustrating examples of a method of transmitting an SRS switching signal according to an antenna selection method based on reinforcement learning according to exemplary embodiments of the present disclosure.

Referring to FIGS. 7A to 7C, after determining the antenna subset based on reinforcement learning according to the method of switching the antenna subset according to the update period, the SRS switching signal may be transmitted, which may be referred to as a "reinforcement learning-based antenna selection method".

Reinforcement learning is a type of machine learning, and may be defined as a method in which an agent defined in a certain environment recognizes the current state and selects an action or action sequence that maximizes Reward among the selectable actions. The reinforcement learning may be performed by the reinforcement learning device 810c of device 100, and the operation of the reinforcement learning device 810c will be described later with reference to FIG. 8C.

The antenna selection method based on reinforcement learning includes a Q-learning-based antenna selection method and a Bandit learning-based antenna selection method according to an embodiment of the present disclosure.

FIG. 7A is a flowchart illustrating a method of transmitting an SRS switching signal according to a Q-learning-based antenna selection method during reinforcement learning.

The Q function expressed as "(state, action)", which is a pair of State and Action, may be defined as a function that may predict the expected value of the utility that executing a given action in a given state will provide. According to an embodiment, device 100 may select an antenna combination having a large Q value, that is, Q(S, A).

In an embodiment, the Action may be defined as an action of selecting an antenna combination for determining an antenna subset, and State, which means a state when a specific antenna is selected, may be defined as a parameter related to a downlink channel. The parameters related to the downlink channel may be determined by correlation in the time, space, and frequency domain, and the strength of the downlink signal. Reward may be defined as a reception performance index for a CSI-RS received from device 100 or a downlink signal including data received using a final beam. The reception performance for the downlink signal may be determined by a block error rate (BLER), frequency efficiency, and strength of the downlink signal.

Table 2 shows a Q-table according to an embodiment of the present disclosure.

TABLE 2

|     | A_1         | A_2         | ... | A_N         |
|-----|-------------|-------------|-----|-------------|
| S_1 | Q(S_1, A_1) | Q(S_1, A_2) | ... | Q(S_1, A_N) |
| ... | ...         | ...         |     | ...         |
| S_M | Q(S_M, A_1) | Q(S_M, A_2) | ... | Q(S_M, A_N) |

Referring to Table 2, for example, A_1 may mean a case where the antenna subset determined by device 100 is {0,1}. S_1 may mean a state corresponding to one of downlink-related parameter values that exist as many as M of possible cases due to various factors such as correlation in the time, space, frequency domain, and strength of a downlink signal.

Q(S_M, A_N) takes an action of selecting an antenna subset that includes the Nth antenna combination, and may mean a Q value in the case of a state corresponding to a parameter numbered by M based on the antenna combination.

In an exemplary embodiment, the update operation of Q may be expressed as follows.

$$Q_{new}(S, A) \leftarrow Q_{old}(S, A) + \alpha\left[R + \gamma\max_{A} Q(S', A) - Q_{old}(S, A)\right] \quad \text{[Equation 2]}$$

α may be defined as a learning rate factor, and may have a value greater than 0 and less than or equal to 1. R corresponds to a Reward value, and γ is a discount factor, and may be defined as a value indicating how important a present reward is than a reward obtained in the future. Q(S',A) may be defined as the optimal Q value expected in the future state S'.

Specifically, device 100 may initialize Q (S,A) to an arbitrary value in operation S710a, which is the first operation of the Q-learning-based algorithm. After initializing Q, the following processes for each episode are repeated:

In operation S720a, device 100 selects whether to take an action randomly with a probability of e or whether to take an action that satisfies $$A = \arg_A^{\max} Q(S, A)$$

with a probability of (1−e). In operation S730a, device 100 observes Reward according to the selected Action and the new state value S', and updates the Q value using [Equation 2] in operation S740a, that is, calculate $Q_{new}(S,A)$. Device 100 determines whether the episode has ended in operation 750a, and if device 100 determines that the episode has not ended, S' is updated to S in operation S760a.

According to an embodiment, device 100 may select an antenna combination constituting an antenna subset based on Q, and after the antenna subset is determined, calculate State and Reward and updates Q to determine another antenna subset based on the updated Q.

FIG. 7B is a flowchart illustrating a method of transmitting an SRS switching signal according to an antenna selection method based on an Upper Confidence Bound (UCB) algorithm during reinforcement learning.

The UCB algorithm may be defined as an algorithm that finds an upper limit value with a high probability of an expected reward at a specific time t, that is, an UCB value, from observation results during that time. For example, the UCB is updated for each action that selects an antenna combination included in the antenna subset, and device 100 may select an antenna subset including an antenna combination having a large UCB. This may be referred to as one of "Bandit learning-based antenna selection methods".

In an exemplary embodiment, the UCB value may be expressed as follows.

$$UBC_k(t) = \begin{cases} \infty, & \text{if } T_k(t-1) > 0 \\ \hat{\mu}_k(t-1) + \sqrt{\dfrac{2\ln\left(\dfrac{1}{\delta}\right)}{T_k(t-1)}}, & \text{if } T_k(t-1) > 0 \end{cases} \quad \text{[Equation 3]}$$

In an exemplary embodiment, Reward and an empirical mean of Reward may be expressed as follows.

$$\hat{\mu}_k(t+1) = \dfrac{1}{T_k(t+1)} \sum_{t=1}^{T_k(t+1)} X_k(t), \text{ where } T_k(t+1) = T_k(t) + 1 \quad \text{[Equation 4]}$$

$T_k(t)$ may be defined as the number of times a corresponding antenna subset is selected up to time t, and S may be defined as a learning parameter. In addition, $X_k(t)$ may be defined as the observed Reward for the k-th Action at time t. In addition, $\hat{\mu}_k(t)$ may be defined as an empirical mean of Reward accumulated up to time t.

For example, device 100 may calculate the UCB at time t in operation S710b, and may select a combination of antennas that maximizes the calculated UCB in operation S720b. In addition, device 100 may measure a CSI-RS channel by selecting one of the antenna combinations selected in operation S730b. Device 100 may calculate Reward and an empirical mean of Reward using [Equation 4] in operation S740b.

The UCB algorithm may operate in operations S710b to S740b, and operations S710b to S740b may be repeated for an arbitrary number of times.

FIG. 7C is a flowchart illustrating a method of transmitting an SRS switching signal according to a probability distribution-based antenna selection method during reinforcement learning.

As an embodiment, device 100 may determine an antenna subset by using a value representing a preference for selection of an antenna combination as a probability. This may be referred to as one of "Bandit learning-based antenna selection methods".

The initial probability for the preference may be arbitrarily set as $$p_k(t) = \dfrac{1}{K},$$

where K may be defined as the number of antenna combinations, that is, the number of all possible antenna subsets. In operation S710c, device 100 may determine an antenna subset including an antenna combination selected according to the learned probability distribution.

As an exemplary embodiment, the probability for preference may be expressed as follows.

$$p_k(t) = (1-\gamma) \dfrac{\exp(\rho \hat{S}_k(t))}{\sum_{j=1}^{K} \exp(\hat{S}_j(t))} + \dfrac{\gamma}{K} \quad \text{[Equation 5]}$$

In operation S720c, device 100 may set a Positive Reward or Negative Reward $\hat{X}_k(t)$ according to an index indicating the performance of the CSI-RS channel allocated the selected antenna combination. For example, an index indicating the performance of the CSI-RS channel may include a signal to interference plus noise ratio (SINR).

In an exemplary embodiment, Reward may be calculated as follows.

$$\hat{X}_k(t) = \begin{cases} \dfrac{\alpha}{p_k(t)}, & \text{if } SINR_k \geq \tau \\ \dfrac{-\beta}{1-p_k(t)}, & \text{if } SINR_k < \tau \end{cases} \quad \text{[Equation 6]}$$

In operation S720c, device 100 may calculate Reward according to the performance of the CSI-RS channel using [Equation 6].

In addition, optionally, device 100 may update Reward of the antenna combination having a high relevance in operation S730c by introducing a weight w. For example, Reward may be updated by multiplying the (k−1)-th Reward and the (k+1)-th Reward by weights $w_1$ and $w_2$, respectively. Next, device 100 updates the probability distribution value by accumulating Rewards for a predetermined time in operation S740c.

As an exemplary embodiment, the probability distribution of accumulated Rewards may be expressed as follows.

$$\hat{S}_k(t) = \sum_{t=1}^{T} \hat{X}_k(t), \; k = 1, \ldots, K \quad \text{[Equation 7]}$$

The probability distribution-based antenna selection method may operate in operations S710c to S740c, and operations S710c to S740c may be repeated for an arbitrary number of times.

In the above-described plurality of reinforcement learning-based antenna selection schemes, Action may be applied by extending to an action of selecting an antenna combination for determining an antenna subset and selecting transmission power. For example, Action may be defined as follows.

Action_i: Selecting the first and third antennas & selecting the transmission power of the first antenna as P_level4 and selecting the transmission power of the third antenna as P_level2

Action_j: Selecting the 0-th antenna and the third antenna & Selecting the transmission power of the 0-th antenna as P_level1 and the transmission power of the third antenna as P_level2

For example, P_level2 may mean power corresponding to level2 set by device 100.

Figure 8:
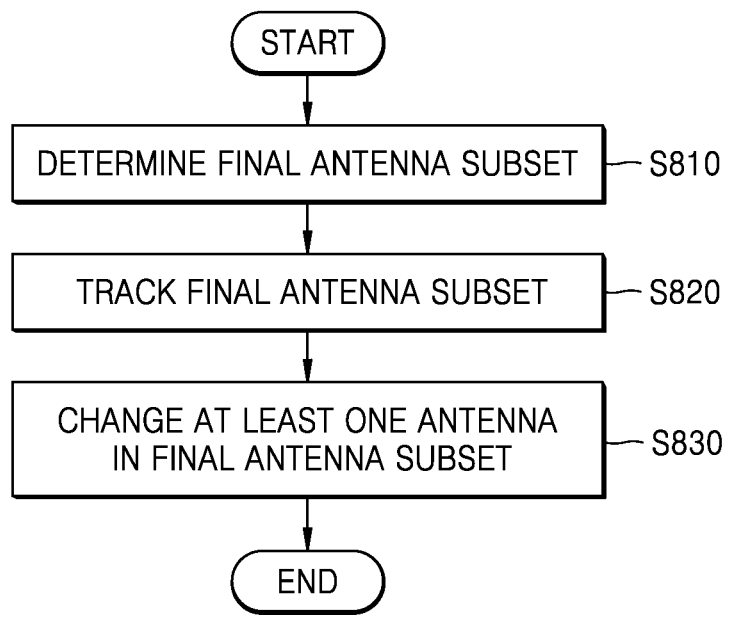
FIG. 8 is a flowchart illustrating an example of a method of tracking a final antenna subset according to an exemplary embodiment of the present disclosure.

FIG. 8 is a flowchart illustrating an example of a method of tracking a final antenna subset according to an exemplary embodiment of the present disclosure.

Referring to FIG. 8, a method of tracking a final antenna subset determined through the methods described with reference to FIGS. 4 to 7C is shown.

Through the embodiments of FIGS. 4 to 7C, in operation S810, device 100 may determine a final antenna subset configured with an optimal antenna combination. After the final antenna subset is determined, in operation S820, device 100 may track the optimal antenna combination with an arbitrary tracking period, and in operation S830, one antenna included in the final antenna subset previously determined or one or more antennas may be changed according to the tracking result.

As an embodiment, when the gain of the final beam is rapidly lowered, an antenna included in the previously determined final antenna subset may not be selected, or the final antenna subset itself may be replaced with another antenna subset. For example, if the antenna subset size is 3, the antenna may be changed to one, changed to two, or changed to a different antenna subset with a different antenna subset size of 3. Tracking and a period are determined from an indicator related to a change in a radio channel, and the tracking period may be a value corresponding to several times the transmission period of the SRS switching signal. For example, the tracking period may be determined according to the Doppler characteristic, which is an index according to the time change of the radio channel, and when the Doppler transition value of the wireless communication device is large, the tracking period may be set short, and when the Doppler transition value is small, the tracking period may be set longer.

Figure 9A:
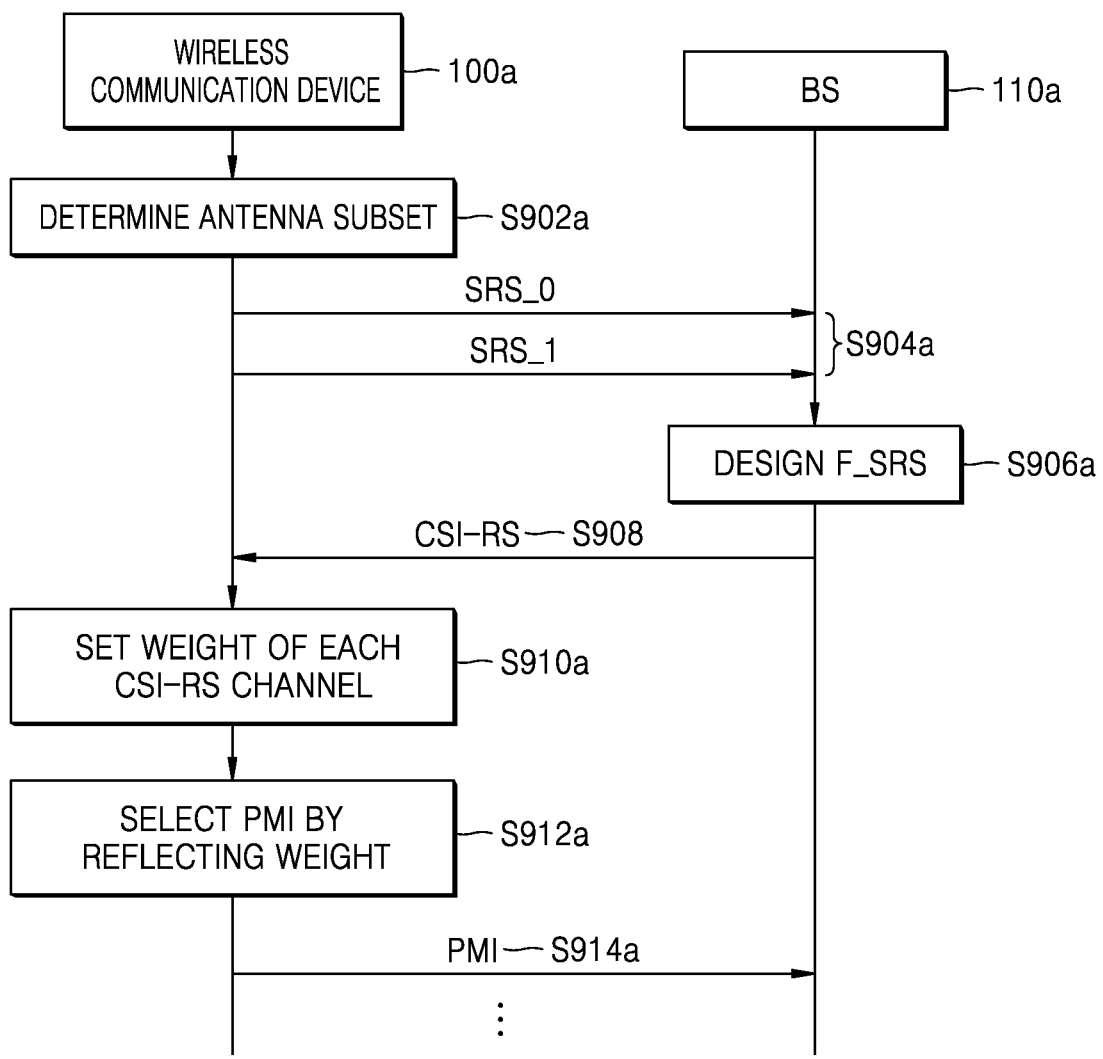
FIGS. 9A and 9B are flowcharts illustrating examples of a method of selecting a pre-coding matrix indicator (PMI) according to exemplary embodiments of the present disclosure.
Figure 9B:
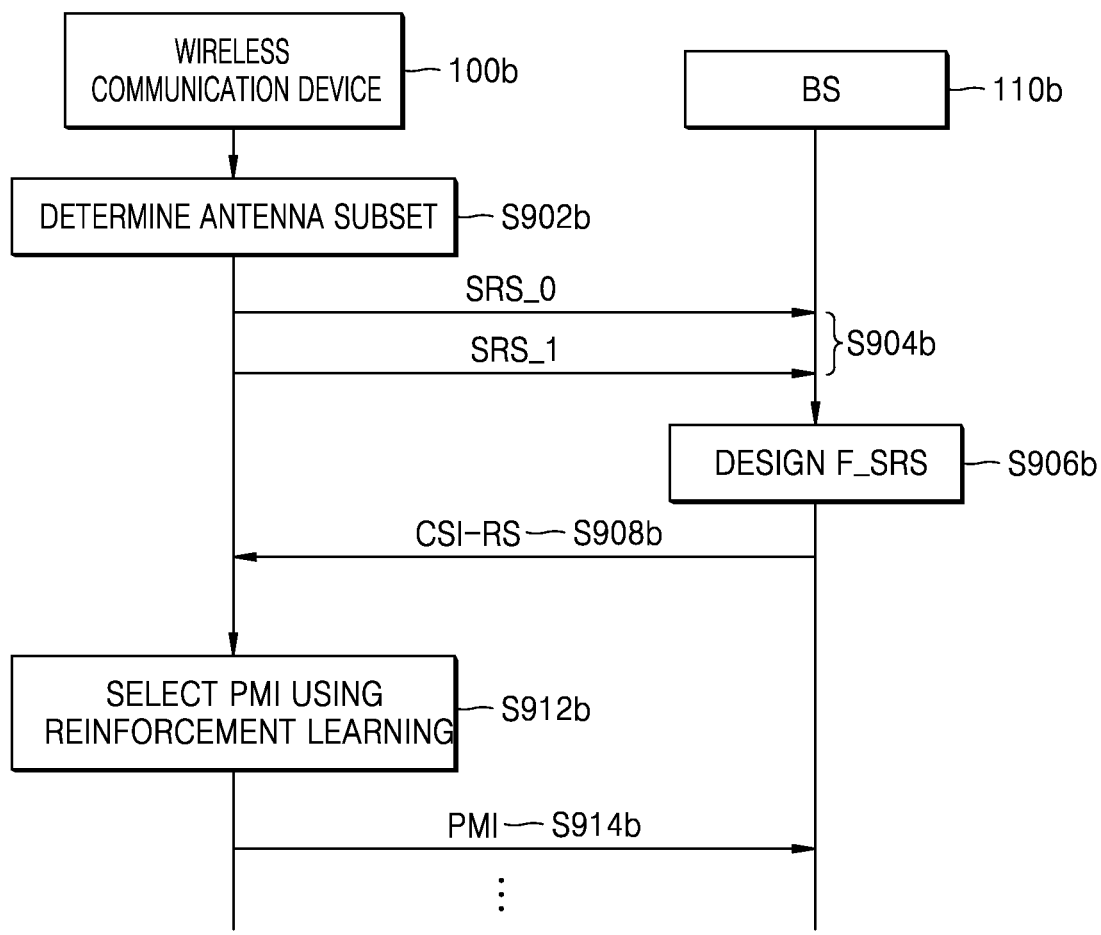

FIGS. 9A and 9B are flowcharts illustrating examples of a method of selecting a pre-coding matrix indicator (PMI) according to exemplary embodiments of the present disclosure.

When 100a and 100b transmit the SRS using limited SRS resources and antennas due to the limitations of the scenarios 1 and 2 described above, beamforming using the downlink channel information obtained by the BS causes loss. Accordingly, the method of selecting a PMI for minimizing signal loss using downlink beamforming received by devices 100a and 100b may include a PMI selection method applying weights according to channels, a PMI selection method based on reinforcement learning, and the like.

FIG. 9A is a flowchart showing a method of selecting a PMI to which a weight is applied according to an exemplary embodiment of the present disclosure.

Referring to FIG. 9A, an example of a PMI selection method for minimizing redundancy of information received by device 100a and minimizing signal loss using beamforming is illustrated. Specifically, a PMI may be selected by applying different weights to channels corresponding to an antenna used for transmission of the SRS switching signal and an antenna not used for transmission of the SRS switching signal.

For example, in operation S902a, device 100a may determine an antenna subset to transmit the SRS switching signal as {0, 1} in the first SRS switching transmission period. In operation S904a, after transmitting SRS_0, which is an SRS switching signal using the first antenna, and SRS_1, which is an SRS switching signal using a second antenna, the BS 110 may design a downlink beam F_SRS using SRS_0 and SRS_1 in operation S906a. The BS 110a may transmit the CSI-RS through the F_SRS beam in operation S908a. Assuming that the channels used for CSI-RS reception are h0, h1, h2, and h3, in operation S910a, device 100a may set weights applied to each channel to w0, w1, w2, and w3. w0 to w3 may be determined according to selection and use when transmitting the SRS switching signal. For example, the weights w0 and w1 of the first and second antennas used for transmitting the SRS switching signal, and the weights w2 and w3 of the third and fourth antennas not used for transmitting the SRS switching signal may be set differently. In operation S912a, device 100a may select the PMI using information obtained by applying a weight to each channel [w0×h0, w1×h1, w2×h2, w3×h3], and feed back the selected PMI to the BS 110a in operation S914a.

According to an embodiment, the weight may be set to have a larger value as the gain of the channel corresponding to the antenna is smaller. Alternatively, the weights may be set so that the gains of channels corresponding to the weighted antennas are all the same.

FIG. 9B is a flowchart showing a method of selecting a PMI based on reinforcement learning according to an exemplary embodiment of the present disclosure.

Referring to FIG. 9B, as in the antenna combination selection method, a method of selecting a PMI based on reinforcement learning is illustrated.

According to an embodiment, in operation S902b, device 100b may determine an antenna subset to transmit the SRS switching signal as {0, 1} in the first SRS switching transmission period. In operation S904b, after transmitting SRS_0, which is an SRS switching signal using the first antenna, and SRS_1, which is an SRS switching signal using a second antenna, the BS 110b may design a downlink beam F_SRS using SRS_0 and SRS_1 in operation S906b. The BS 110b may transmit the CSI-RS through the F_SRS beam in operation S908b. In operation S912a, device 100 may select a PMI using reinforcement learning. Specifically, UCB-based among Q-learning and bandit learning, and gradient bandit learning-based among bandit learning PMI selection methods may all be applied. As an example, Action may be defined as an action that selects PMI, and State may be defined as a performance index for a channel in which a CSI-RS signal is received, and Reward may be defined as a performance index for a channel in which a downlink signal is received using a final beam. That is, device 100b may select a PMI that maximizes the "performance of the final beam reception channel" corresponding to Reward among selectable PMIs by recognizing State representing the performance of the channel used for receiving the CSI-RS signal. The wireless communication device 100b may feed back the selected PMI to the BS 110b in operation S914a.

Figure 10A:
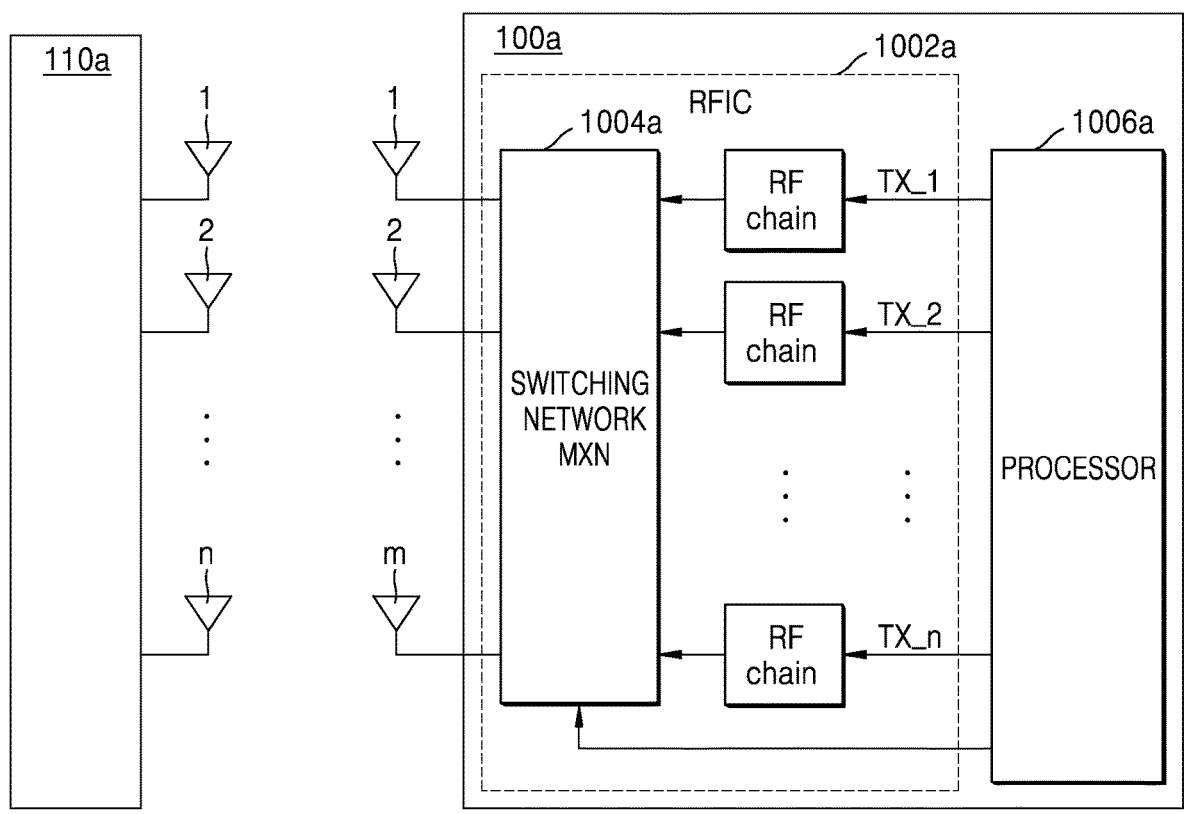
FIGS. 10A, 10B and 10C are block diagrams illustrating structures of a wireless communication device according to exemplary embodiments of the present disclosure.
Figure 10B:
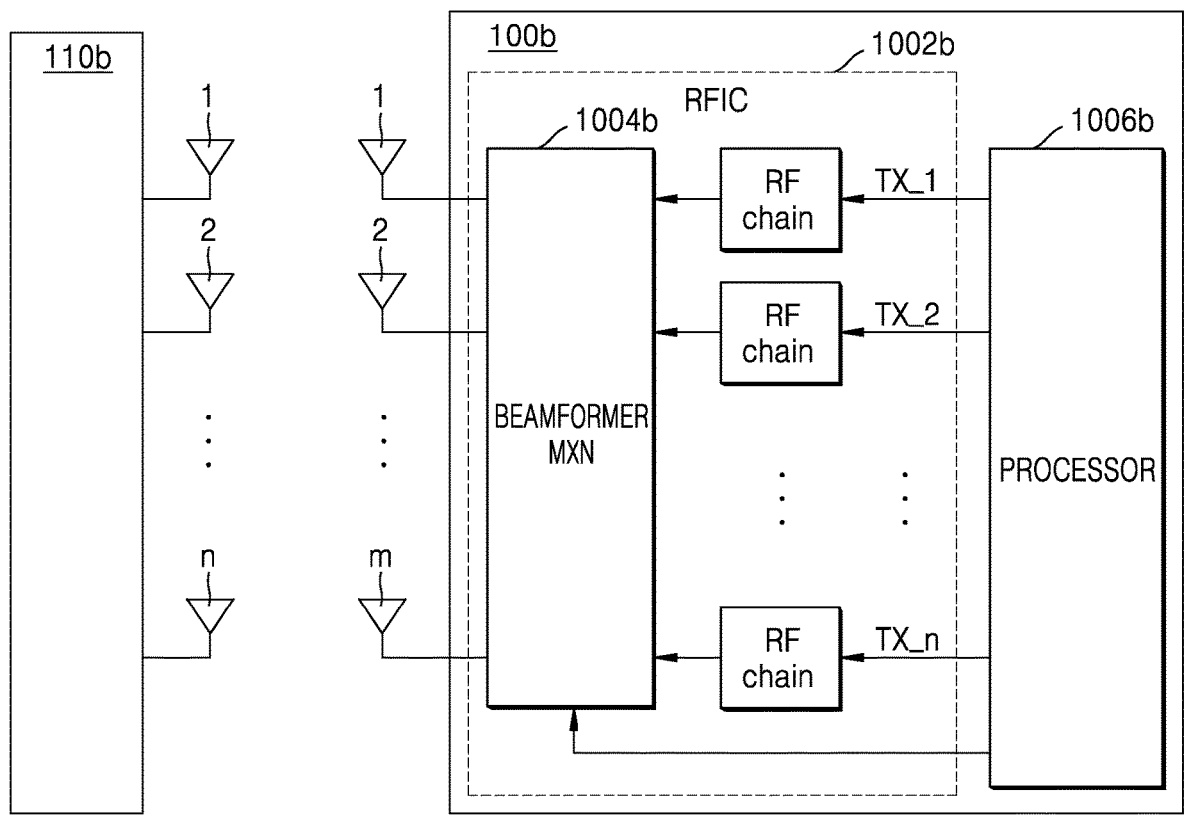
Figure 10C:
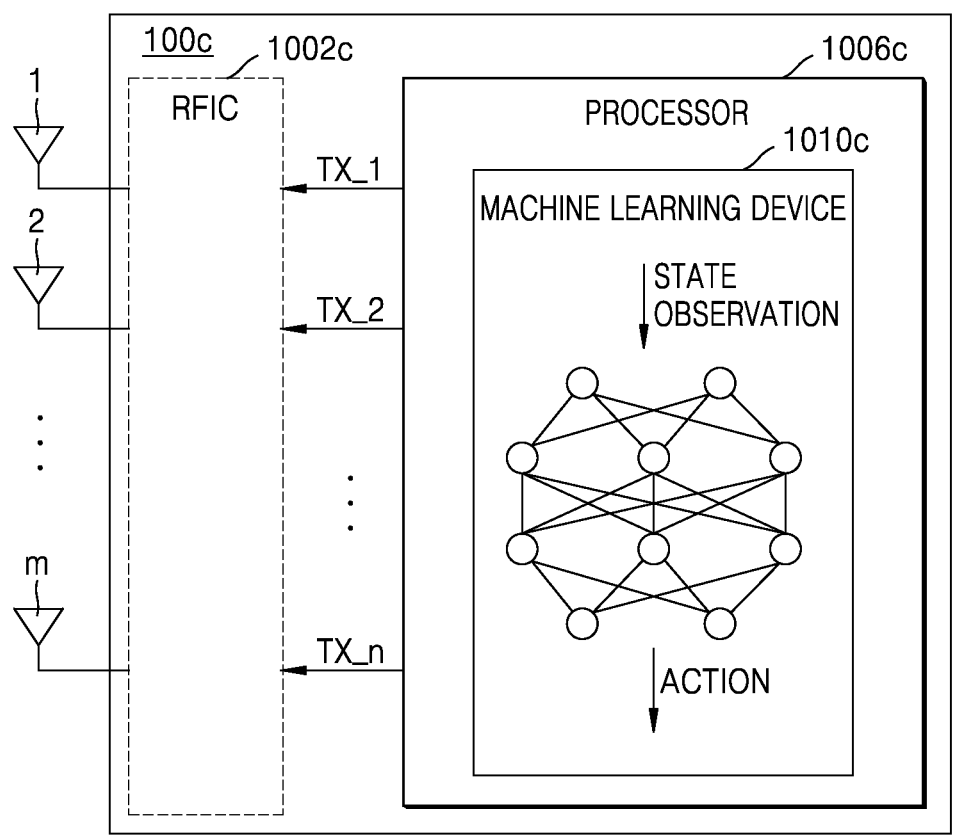

FIGS. 10A to 10C are block diagrams illustrating structures of a wireless communication device according to exemplary embodiments of the present disclosure.

FIG. 10A is a block diagram showing structures of a wireless communication device based on an antenna selection method according to an exemplary embodiment of the present disclosure.

Referring to FIG. 10A, device 100a may include first to m-th antennas 1 to m, a radio-frequency integrated circuit (RFIC) 1002a, and a processor 1006a. The RFIC 1002a may include a switching network 1004a and first to n-th RF chains. The RFIC 1002a may include a plurality of RF chains, and device 100a may include a plurality of RFICs. The switching network 1004a may be connected to the first to m-th antennas 1 to m. In some cases, only one RF chain may be in the RFIC 1002a, or may be connected to each individual antenna.

The processor 1006a according to the exemplary embodiment of the present disclosure may identify the downlink reference signal from the SRS switching resource set by the BS 110a. The processor 1006a may generate downlink channel information using the downlink reference signal, select an antenna combination including at least one of the first to m-th antennas 1 to m, determine an antenna subset including the corresponding antenna combination, and control the switching network 1004a based on the determined antenna subset.

The switching network 1004a according to an exemplary embodiment of the present disclosure may be connected to the processor 1006a. Also, the switching network 1004a may select at least one of the antennas included in the antenna subset determined by the processor 1006a. The SRS switching signal may be transmitted to the BS 110a through the selected antenna.

The processor 1006a according to an embodiment of the present disclosure may select a PMI based on the CSI-RS received from the BS 110a using the first beam, and may transmit the selected PMI to the BS. The BS 110a may transmit a downlink signal including data or the like using the final beam, and the processor 1006a may process the received downlink signal. The final beam may be determined by information obtained from the SRS switching signal and information obtained from the PMI.

FIG. 10B is a block diagram showing structures of a wireless communication device based on a beam selection method according to an exemplary embodiment of the present disclosure.

Referring to FIG. 10B, device 100b may include first to m-th antennas 1 to m, an RFIC 1002b, and a processor 1006b. The RFIC 1002b may include a beamformer 1004b and first to n-th RF chains. The RFIC 1002b may include a plurality of RF chains, and device 100b may include a plurality of RFICs. The beamformer 1004b may be connected to the first to m-th antennas 1 to m. In some cases, only one RF chain may be in the RFIC 1002b, or may be connected to each individual antenna.

The processor 1006b according to the exemplary embodiment of the present disclosure may identify the downlink reference signal from the SRS switching resource set by the BS 110b. The processor 1006b may generate downlink channel information using the downlink reference signal, and may select a beam using the previously shared beam codebook information. The processor 1006b may design an optimal beam when there is no pre-shared beam code book. The processor 1006b may design a new beam considering reception performance and spatial characteristics, and may control the beamformer 1004b based on the determined beam.

The beamformer 1004b according to an exemplary embodiment of the present disclosure may be connected to the processor 1006b. In addition, the beamformer 1004b may form a beam according to beam information selected (or designed) by the processor 1006b. The SRS switching signal may be transmitted to the BS 110b through the formed beam.

The processor 1006b according to an embodiment of the present disclosure may select a PMI based on the CSI-RS received from the BS 110b using the first beam, and may transmit the selected PMI to the BS. The BS 110b may transmit a downlink signal including data or the like using the final beam, and the processor 1006b may process the received downlink signal. The final beam may be determined by information obtained from the SRS switching signal and information obtained from the PMI.

FIG. 10C is a block diagram showing structures of a wireless communication device based on a reinforcement learning method according to an exemplary embodiment of the present disclosure.

Referring to FIG. 10C, a wireless communication device 100c may include first to m-th antennas 1 to m, an RFIC 1002c, and a processor 1006c. The processor 1006c may include a machine learning device 1010c for performing the reinforcement learning-based antenna selection method, the reinforcement learning-based beam selection method, or the reinforcement learning-based PMI selection method.

For example, the machine learning device 1010c may observe State, select an Action, and calculate Reward and Q in order to perform the Q-learning-based antenna selection method of FIG. 7A. That is, the machine learning device 910c may perform the operations for reinforcement learning disclosed in FIGS. 7A to 7C and 8B, and detailed descriptions thereof will be omitted.

As an example, in the Q-learning-based antenna selection method of FIG. 7A, the machine learning device 910c may calculate Q(S,A) having the largest value in a given state using the Q-table in [Table 2], and select an antenna combination corresponding to the corresponding Q value based on the learned information.

While the inventive concept has been particularly shown and described with reference to embodiments thereof, it will be understood that various changes in form and details may be made therein without departing from the spirit and scope of the following claims and their equivalents.

What is claimed is:

1. A method of operating a wireless communication device including a plurality of antennas, the method comprising:
  determining a plurality of antenna subsets, each including at least two of the plurality of antennas;
  transmitting a sounding reference signal (SRS) switching signal, comprising a plurality of SRSs, to a base station through the plurality of antenna subsets sequentially in an order of a first one of the antenna subsets having a largest separation distance between the at least two antennas thereof to a last one of the antenna subsets having a shortest separation distance between the at least two antennas thereof;
  receiving a channel state information-reference signal (CSI-RS) transmitted from the base station through a first beam;
  selecting a precoding matrix indicator (PMI) based on the CSI-RS;

transmitting the selected PMI to the base station; and receiving a signal, transmitted from the base station through a second beam determined based on the SRS switching signal and the PMI.

2. The method of claim 1, wherein the determining of the plurality of antenna subsets is performed when a number of SRS switching resources allocated by the base station for the SRS switching signal is less than a number of reception antennas of the wireless communication device.

3. The method of claim 1, wherein the determining of the plurality of antenna subsets is performed when a number of RF chains of the wireless communication device is less than a number of reception antennas of the wireless communication device.

4. The method of claim 1, further comprising:

monitoring a gain value of the second beam; and determining a final antenna subset based on the monitored gain value of the second beam.

5. The method of claim 4, further comprising calculating the gain value of the second beam by at least one of power of a received signal, a signal to noise ratio (SNR) of a received signal, frequency efficiency, and decoding performance of a received signal.

6. The method of claim 4, wherein the sequential transmitting of the SRS switching signal is performed in sequential transmission periods of the SRS switching signal, the SRS switching signal being transmitted through a respective one of the plurality of antenna subsets in each of the transmission periods.

7. The method of claim 4, further comprising determining the antenna subset as a final antenna subset when the gain value of the monitored second beam exceeds a predetermined threshold value.

8. The method of claim 1, wherein the determining of the antenna subsets is performed without measuring spatial correlation between the plurality of antennas.

9. The method of claim 1, further comprising determining an antenna subset based on reinforcement learning.

10. The method of claim 4, further comprising:

tracking the final antenna subset for each tracking period; and changing at least one antenna included in the antenna subset based on a tracking result.

11. The method of claim 1, comprising determining a final antenna subset based on at least one of a signal to interference plus noise ratio (SINR) of the wireless communication device, a transmission/reception characteristic of an antenna, and a linearity of a transmission power amplifier.

12. The method of claim 1, wherein the selecting of the PMI comprises selecting a PMI based on information on a weight applied to a CSI-RS reception channel.

13. The method of claim 1, wherein the selecting of the PMI comprises selecting a PMI based on reinforcement learning.

14. A wireless communication device comprising:

a plurality of antennas;

a radio-frequency integrated circuit (RFIC) including a switching network connected to the plurality of antennas, wherein the switching network is configured to transmit a sounding reference signal (SRS) switching signal, comprising a plurality of SRSs, to a base station through at least one antenna of an antenna subset of the plurality of antennas; and a processor configured to:

determine the antenna subset based at least in part on a linearity of a transmission power amplifier;

select a precoding matrix indicator (PMI) to be provided to the base station based on a channel state information-reference signal (CSI-RS) transmitted from the base station through a first beam; and process a signal transmitted from the base station through a second beam determined based on the SRS switching signal and the PMI, wherein the processor is configured to monitor a gain value of the second beam and determine a final antenna subset based on the monitored gain value of the second beam.

15. The wireless communication device of claim 14, wherein, when a number of SRS switching resources allocated by the base station for the SRS switching signal is less than a number of reception antennas of the wireless communication device, the processor is configured to determine an antenna subset.

16. The wireless communication device of claim 14, wherein, when a number of radio frequency (RF) chains of the wireless communication device is less than a number of reception antennas of the wireless communication device, the processor is configured to determine an antenna subset.

17. The wireless communication device of claim 14, wherein the processor is configured to sequentially determine each of a plurality of antenna subsets for each transmission period of the SRS switching signal.

18. A method of operating a base station communicating with a wireless communication device including a plurality of antennas, the method comprising:

receiving a sounding reference signal (SRS) switching signal, comprising a plurality of SRSs, transmitted through a plurality of antenna subsets sequentially in an order of a first one of the antenna subsets having a largest separation distance between at least two antennas thereof to a last one of the plurality of subsets having a shortest separation distance between at least two antennas thereof;

estimating uplink channel information based on the SRS switching signal;

estimating downlink channel information based on the estimated uplink channel information;

determining and forming a first beam based on the estimated downlink channel information, wherein a channel state information-reference signal (CSI-RS) is transmitted through the first beam;

receiving a precoding matrix indicator (PMI) from the wireless communication device; and determining and forming a second beam based on the received SRS switching signal and the received PMI, wherein a signal including data is transmitted through the second beam.

19. The method of claim 18, wherein a gain value of the second beam is monitored by the wireless communication device, wherein a final antenna subset is determined by the wireless communication device based on the monitored gain value of the second beam.

* * * * *